US012039742B2

(12) United States Patent
Lin et al.

(10) Patent No.: US 12,039,742 B2
(45) Date of Patent: Jul. 16, 2024

(54) SUPERVISED LEARNING AND OCCLUSION MASKING FOR OPTICAL FLOW ESTIMATION

(71) Applicant: QUALCOMM Incorporated, San Diego, CA (US)

(72) Inventors: Jamie Menjay Lin, San Diego, CA (US); Jisoo Jeong, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 17/510,763

(22) Filed: Oct. 26, 2021

(65) Prior Publication Data

US 2022/0156946 A1    May 19, 2022

Related U.S. Application Data

(60) Provisional application No. 63/113,723, filed on Nov. 13, 2020.

(51) Int. Cl.
G06K 9/00        (2022.01)
G06N 3/08        (2023.01)
(Continued)

(52) U.S. Cl.
CPC .............. *G06T 7/248* (2017.01); *G06N 3/08* (2013.01); *G06T 3/60* (2013.01);
(Continued)

(58) Field of Classification Search
CPC ..... G06T 7/20–292; G06T 2207/20081; G06T 2207/20084; G06T 7/30–38;
(Continued)

(56) References Cited

U.S. PATENT DOCUMENTS 8,718,328 B1 *   5/2014  Gaddy ................... G06V 10/26
                                              382/103
2019/0138889 A1 * 5/2019  Jiang ...................... G06N 3/045
                              (Continued)

OTHER PUBLICATIONS

Geoff French, Avital Oliver, Tim Salimans, "Milking CowMask for Semi-Supervised Image Classification", arXiv:2003. 12022 [cs. CV], (or arXiv:2003.12022v3 [cs.CV] for this version), https://doi.org/10.48550/arXiv.2003.12022, Jun. 5, 2020, pp. 1-11 (Year: 2020).*

(Continued)

*Primary Examiner* — Atiba O Fitzpatrick
(74) *Attorney, Agent, or Firm* — Polsinelli/Qualcomm

(57) ABSTRACT

Systems and techniques are described for performing supervised learning (e.g., semi-supervised learning, self-supervised learning, and/or mixed supervision learning) for optical flow estimation. For example, a method can include obtaining an image associated with a sequence of images and generating an occluded image. The occluded image can include at least one of the image with an occlusion applied to the image and a different image of the sequence of images with the occlusion applied. The method can include determining a matching map based at least on matching areas of the image and the occluded image and, based on the matching map, determining a loss term associated with an optical flow loss prediction associated with the image and the occluded image. The loss term may include a matched loss and/or other loss. Based on the loss term, the method can include training a network configured to determine an optical flow between images.

31 Claims, 23 Drawing Sheets

(51) Int. Cl.
*G06T 3/60* (2006.01)
*G06T 7/246* (2017.01)

(52) U.S. Cl.
CPC ............ *G06T 2207/10016* (2013.01); *G06T 2207/20081* (2013.01); *G06T 2207/20084* (2013.01)

(58) Field of Classification Search
CPC ... G06T 2219/2004; G06T 2207/20212; G06T 2207/20221; G06N 3/08–0985; G06N 3/02–126; G06N 20/00–20; G06F 18/214–2155; G06F 7/023; G06F 40/16; G06K 9/6256; G06K 9/6257; G06K 9/6259; G06V 10/70; G06V 10/82; G06V 10/774–7796; G06V 10/759; G06V 30/19013; A61B 2090/364
See application file for complete search history.

(56) References Cited

U.S. PATENT DOCUMENTS

| | | | |
|---|---|---|---|
| 2020/0211206 A1* | 7/2020 | Wang | G06N 3/08 |
| 2021/0279840 A1* | 9/2021 | Chi | G06T 3/40 |
| 2021/0326694 A1* | 10/2021 | Wang | G06T 7/593 |
| 2021/0327031 A1* | 10/2021 | Xie | G06T 5/70 |
| 2021/0358137 A1* | 11/2021 | Lee | G06N 3/045 |
| 2022/0277592 A1* | 9/2022 | Hosono | G06T 3/60 |

OTHER PUBLICATIONS

International Search Report and Written Opinion—PCT/US2021/072062—ISA/EPO—Mar. 1, 2022.
Liu P., et al., "SelFlow: Self-Supervised Learning of Optical Flow", 2019 IEEE/CVF Conference on Computer Vision and Pattern Recognition (CVPR), IEEE, Jun. 15, 2019, pp. 4566-4575, XP033686895, DOI: 10.1109/CVPR.2019.00470 [retrieved on Jan. 8, 2020] the whole document.
Teed Z., et al., "RAFT: Recurrent All-Pairs Field Transforms for Optical Flow", arxiv.org, Cornell University Library, 201 Olin Library Cornell University, Ithaca, NY, 14853, Jul. 22, 2020, 21 Pages, XP081714871, cited in the application, the whole document.
Wang Y., et al., "Occlusion Aware Unsupervised Learning of Optical Flow", arxiv.org, Cornell University Library, 201 Olin Library Cornell University, Ithaca, NY, 14853, Nov. 16, 2017, 10 Pages, XP080837653, the whole document.

* cited by examiner

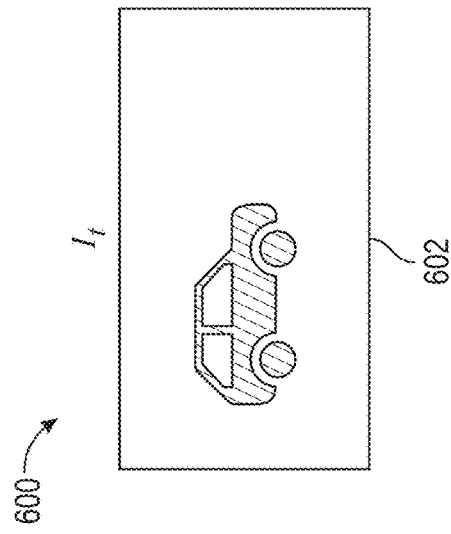
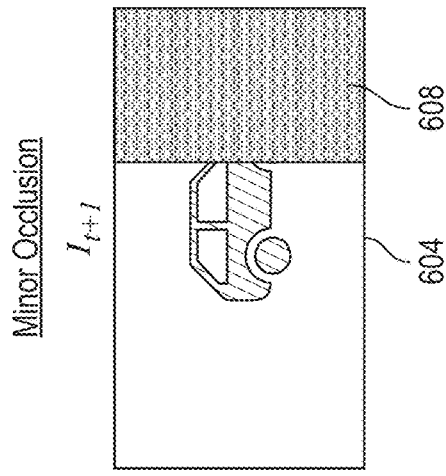
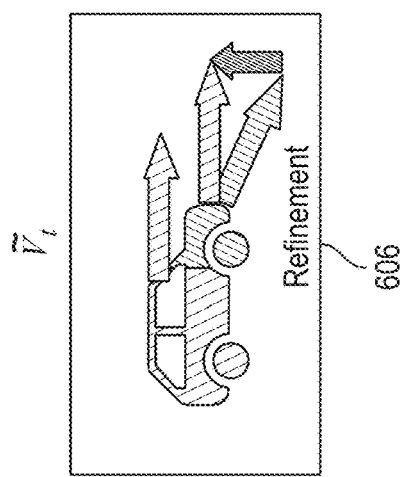
FIG. 6A
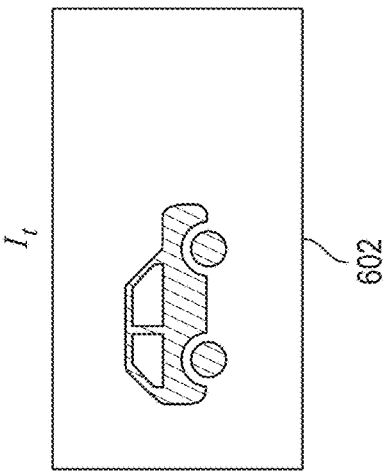
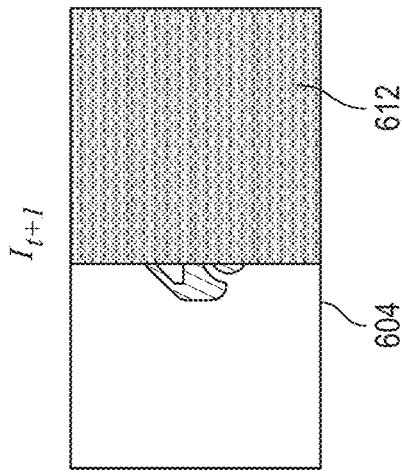
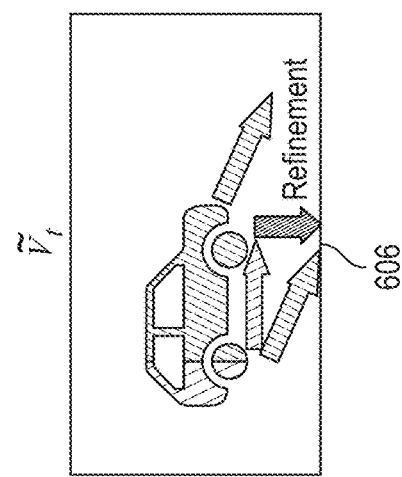
FIG. 6B

SUPERVISED LEARNING AND OCCLUSION MASKING FOR OPTICAL FLOW ESTIMATION

CROSS-REFERENCE TO RELATED APPLICATIONS

The present application claims the benefit of U.S. Provisional Application No. 63/113,723, filed Nov. 13, 2020, entitled "SUPERVISED LEARNING AND OCCLUSION MASKING FOR OPTICAL FLOW ESTIMATION," which is hereby incorporated by reference in its entirety and for all purposes.

TECHNICAL FIELD

The present disclosure generally relates to optical flow estimation.

SUMMARY

Disclosed are systems, processes (also referred to as methods), and computer-readable media for self-supervised learning, semi-supervised learning, and mixed supervision learning (e.g., a combination of self and semi-supervised learning and/or aspects thereof) for optical flow. According to at least one example, a method is provided for self-supervised learning, semi-supervised learning, and mixed supervision learning for optical flow. The method can include obtaining an image associated with a sequence of images; generating an occluded image; determining a matching map based at least on matching areas of the image and the occluded image; based on the matching map, determining a loss term associated with an optical flow loss prediction associated with the image and the occluded image, the loss term including a match loss term; and based on the loss term, training a network configured to determine an optical flow between images.

According to at least one example, an apparatus is provided for self-supervised learning, semi-supervised learning, and mixed supervision learning for optical flow. In some examples, the apparatus can include memory and one or more processors coupled to the memory, the one or more processors being configured to obtain an image associated with a sequence of images; generate an occluded image; determine a matching map based at least on matching areas of the image and the occluded image; based on the matching map, determine a loss term associated with an optical flow loss prediction associated with the image and the occluded image, the loss term including a match loss term; and based on the loss term, train a network configured to determine an optical flow between images.

According to at least one example, a non-transitory computer-readable medium is provided for self-supervised learning, semi-supervised learning, and mixed supervision learning for optical flow. The non-transitory computer-readable medium can include instructions stored thereon which, when executed by one or more processors, cause the one or more processors to obtain an image associated with a sequence of images; generate an occluded image; determine a matching map based at least on matching areas of the image and the occluded image; based on the matching map, determine a loss term associated with an optical flow loss prediction associated with the image and the occluded image, the loss term including a match loss term; and based on the loss term, train a network configured to determine an optical flow between images.

According to at least one example, an apparatus is provided for self-supervised learning, semi-supervised learning, and mixed supervision learning for optical flow. The apparatus can include means for obtaining an image associated with a sequence of images; generating an occluded image; determining a matching map based at least on matching areas of the image and the occluded image; based on the matching map, determining a loss term associated with an optical flow loss prediction associated with the image and the occluded image, the loss term including a match loss term; and based on the loss term, training a network configured to determine an optical flow between images.

In some aspects, the method, apparatus, and computer-readable medium described above can apply one or more horizontal flips to the image and/or the different image to yield one or more flipped images; and calculate one or more optical flow prediction losses based on the one or more flipped images. In some examples, training the network is further based on the one or more optical flow prediction losses.

In some aspects, the method, apparatus, and computer-readable medium described above can apply one or more rotations to the image and/or the different image to yield one or more rotated images; and calculating one or more optical flow prediction losses based on the one or more rotated images.

In some aspects, training the network can be further based on one or more occlusion masks calculated for portions of the image and the occluded image having no correspondence.

In some examples, the sequence of images can include labeled pairs of images. In some cases, each labeled pair of images can include a set of consecutive images within the sequence of images. In some cases, training the network can be further based on labeled pairs of images from the sequence of images.

In some aspects, the method, apparatus, and computer-readable medium described above can generate additional labeled pairs of images, each additional labeled pair of images including a set of non-consecutive images within the sequence of images. In some cases, training the network is further based on the additional labeled pairs of images.

In some examples, the network can include a convolutional neural network. In some cases, the network can include a recurrent all-pairs field transform network.

In some examples, the matching map predicts which pixels match between the image and the occluded image and which pixels do not image between the image and the occluded image.

In some aspects, the occluded image comprises at least one of the image with an occlusion applied to the image and a different image of the sequence of images with the occlusion applied to the different image. In some cases, the method, apparatus, and computer-readable medium described above can include generate the occlusion; and apply the occlusion to at least one of the image and the different image. In some examples, the occlusion can include a cow-mask occlusion.

In some aspects, each apparatus described above is or includes a camera, a mobile device (e.g., a mobile telephone or so-called "smart phone" or other mobile device), a smart wearable device, an extended reality device (e.g., a virtual reality (VR) device, an augmented reality (AR) device, or a mixed reality (MR) device), a personal computer, a laptop computer, a server computer, an autonomous vehicle, or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 6A is a diagram illustrating a minor occlusion scenario, in accordance with some examples of the present disclosure;

FIG. 6B is a diagram illustrating a major occlusion scenario, in accordance with some examples of the present disclosure;

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Optical flow is an active area of research in computer vision. Optical flow can represent the pixel-level (e.g., dense) correspondence between sequential images. By performing optical flow techniques, a system can predict pixel-level flow maps ($V_t$) between two consecutive images ($I_t$, $I_{t+1}$). Optical flow can be used for a variety of tasks such as, for example and without limitation, video compression, action recognition, object tracking, detection, visual tracking, and other video tasks. Improvements to optical flow can help improve the performance of tasks and algorithms that use optical flow. However, there are various problems or challenges with optical flow. For example, occlusion of certain objects in a scene can create significant challenges in optical flow. Another example challenge is the lack of data, such as for training machine-learning based optical flow systems. For example, the available dataset for optical flow is limited, as labeling pixel-level annotations can consume significant costs and time.

Figure 5:
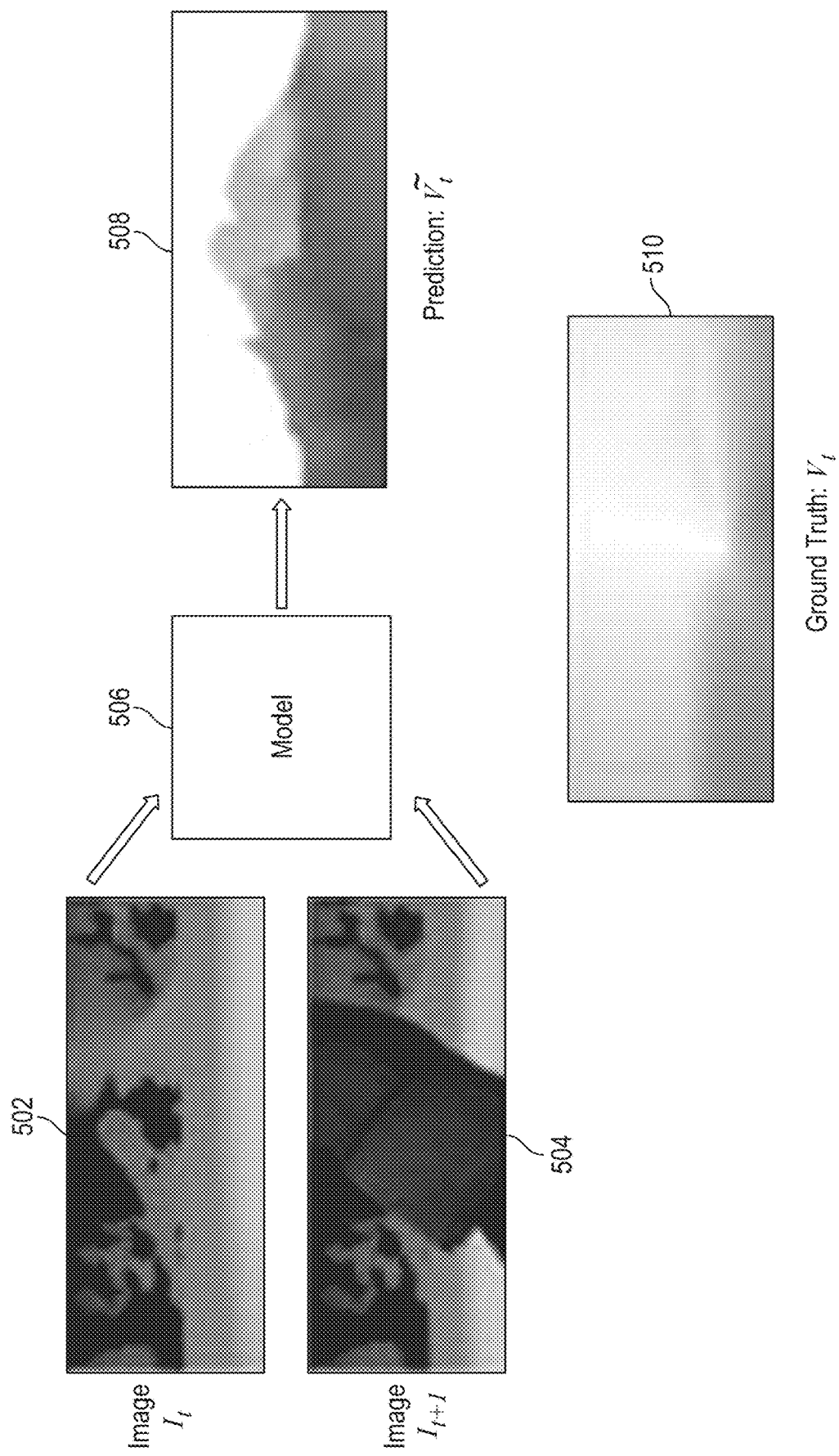
FIG. 5 is a diagram illustrating an example flow prediction refinement, in accordance with some examples of the present disclosure.

In the case of occlusion, a problem can occur when some objects disappear or appear between two successive images. In this case, the correlation between consecutive images ($I_t$, $I_{t+1}$) and pixel-level flow maps ($V_t$) becomes unmatched ($I_t(x; y) \approx I_{t+1}(x+V_t(u), y+V_t(v))$). In one example approach for addressing the occlusion problem, a system can ignore the occlusion area and train the non-occlusion area using an occlusion mask. However, excluding the occlusion area can have disadvantages. For example, the flow for occlusion is generally better computed in an evaluation phase of a machine learning system. Another example approach for addressing the occlusion problem is to use segmentation information. For instance, an example algorithm that can be implemented is a recurrent all-pairs field transforms (RAFT) algorithm, described in Zachary Teed and Jia Deng, *RAFT: Recurrent All-Pairs Field Transforms for Optical Flow*, arXiv preprint arXiv:2003.12039, 2020, which is expressly incorporated herein in its entirety and for all purposes. RAFT considers the segment information using a context network. The pixels in one segment may have a similar flow and, in consideration of this, the flow predicted incorrectly in the occlusion area may be refined. However, as shown in FIG. 5 and further discussed below, even a small portion of a matched part in an image may be incorrectly refined when most of the area in the image is occluded, resulting in poor performance.

Figure 7:
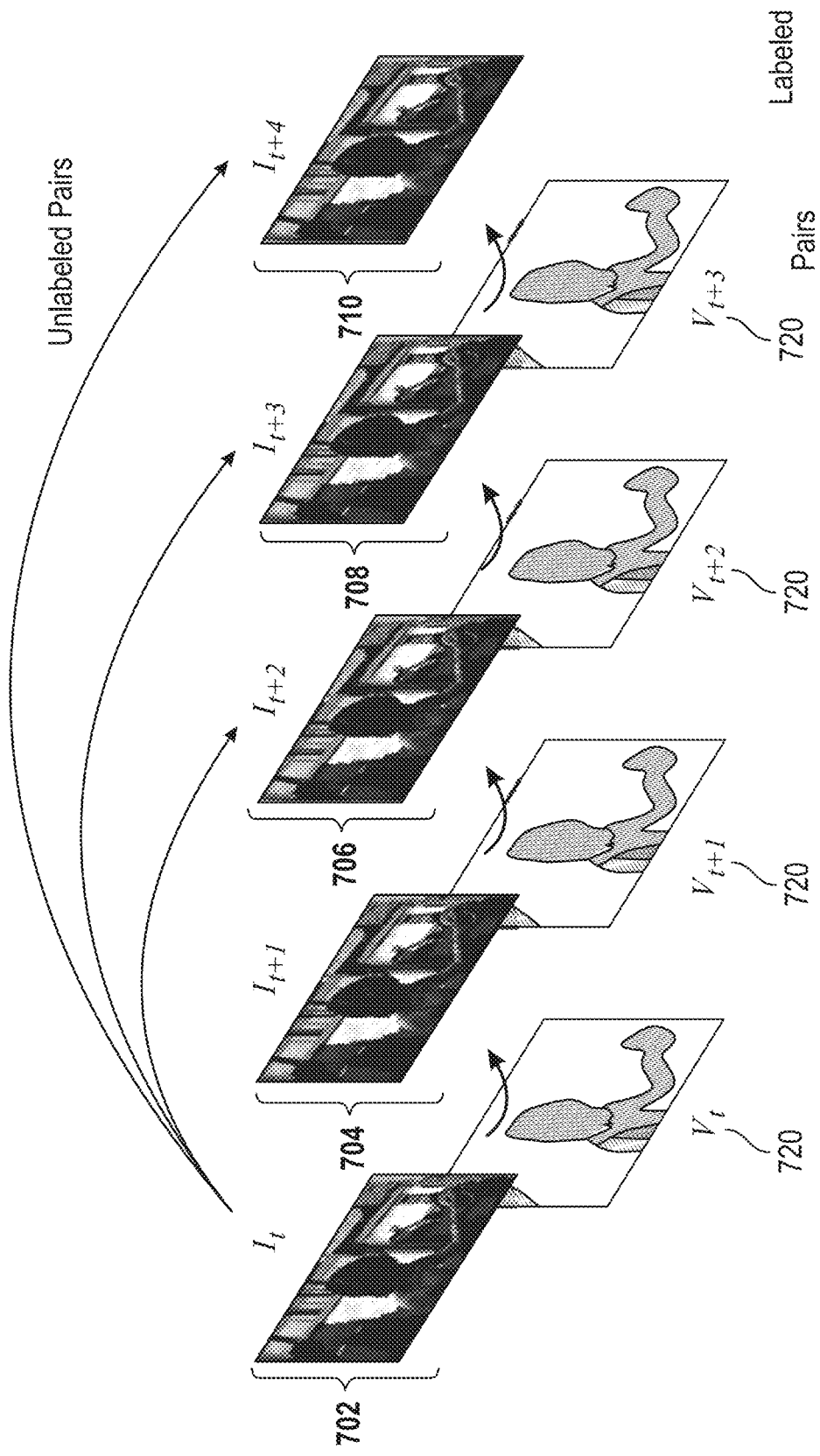
FIG. 7 is a diagram illustrating example labeled and unlabeled datasets for supervised learning, in accordance with some examples of the present disclosure.

As previously noted, another example challenge in optical flow relates to the distribution of data being limited, as shown in FIG. 7. Because pixel-level annotations can be very expensive, most datasets only provide a ground truth between consecutive images $I_t$ and $I_{t+1}$. Also, the image frequency rate of the datasets is different for each dataset. For example, the MPI Sintel Flow dataset includes of 24 frames-per-second (FPS), while the KITTI dataset from the Karlsruhe Institute of Technology and Toyota Technological Institute at Chicago (available at http://www.cvlibs.net/datasets/kitti) includes 10 FPS.

Systems, processes (or methods), and computer-readable media (collectively referred to herein as "systems and techniques") for using supervised learning (e.g., self-supervised learning, semi-supervised learning, and/or mixed supervision learning) for optical flow (e.g., to train a machine learning system, such as a neural network, to perform optical flow) are described herein. The unsupervised learning, semi-supervised learning, and mixed supervision learning technologies described herein for optical flow can address the occlusion and limited data problems described above, and provide improved optical flow performance. In some examples, a self-supervised learning process can be implemented for solving occlusion problems. In some examples, a semi-supervised learning process can be implemented for using various data pairs (e.g., pairs of images). In some examples, a mixed supervision learning process can be implemented. The mixed supervision learning can include self-supervised learning, semi-supervised learning, a combination of self and semi-supervised learning (and/or aspects thereof), and/or specific or mixed implementations of semi-supervised learning and/or self-supervised learning.

In some self-supervised learning examples, a system can generate an occlusion. The system can apply the occlusion to consecutive images (e.g., images $I_t$, $I_{t+1}$ in FIGS. 5 and 7). In some examples, an additional channel can be added, which the system can use to predict a matching map. In some examples, the system can predict a matching area between sequential images using self-supervised learning. In some cases, the system can generate a pseudo-occlusion ground truth from a difference between the image $I_t$ and a warped image ($I_t(x; y)$, $I_{t+1}$ $(x+V_t(u), y+V_t(v))$). The system can set an area where the difference between the two images is large as the occlusion area. The system can exclude the occlusion area from training to perform training on the better-mapped or better-mapping area. In some cases, the difference between the image $I_t$ and the warped image $I_{t+1}$ may be a very small value. However, errors may exist, such as due to differences in light or changes in values in continuous space. To address such a potential issue, an occlusion threshold can be set in some implementations. In some cases, the occlusion threshold can be heuristic. In some cases, the occlusion area can be trained directly. Using such techniques, the system can create data by directly creating occlusions and can use the occlusions in training of a machine learning system.

In some examples, the system can utilize a consistency regularization process for semi-supervised learning. The consistency regularization process can be used in classification, and can perform well in regression. In some examples, the system can perform a rotation consistency-based semi-supervised learning process for optical flow. For example, a horizontal flip and random rotation can be used for semi-supervised learning. After applying a horizontal flip and/or random rotation to the rotated images ($R(I_t)$, $R(I_{t+k})$), the output ($R(\tilde{V})$) of the machine learning system (e.g., a neural network) can be restored ($R^{-1}$ $R(\tilde{V})$). In some examples, the output can be the same or similar to the output of the original values ($\tilde{V}$). In some examples, the rotation and restored output can be applied to enable learning between images ($I_t$), ($I_{t+k}$).

Further aspects of the present disclosure are described herein with respect to the figures.

Figure 1:
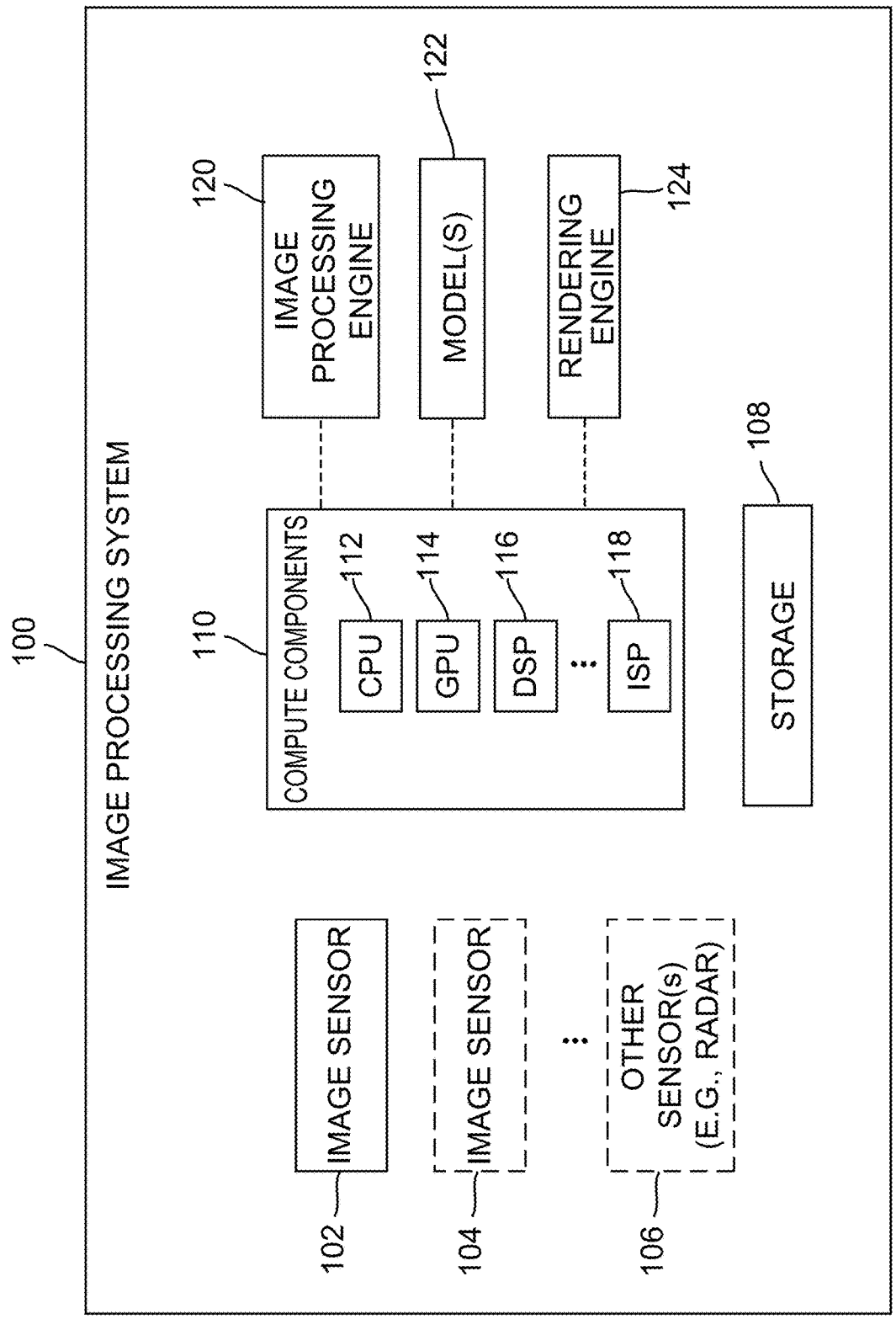
FIG. 1 is a simplified block diagram illustrating an example image processing system, in accordance with some examples of the present disclosure.

FIG. 1 is a diagram illustrating an example image processing system 100, in accordance with some examples. The image processing system 100 can perform various image and video processing tasks and generate various image and video processing results as described herein. For example, the image processing system 100 can perform self-supervised learning, semi-supervised learning, and mixed supervision learning for optical flow, as further described herein. In some examples, the image processing system 100 can implement one or more models 122, such as one or more neural networks, to perform self-supervised, semi-supervised learning, and mixed supervision learning for optical flow. In some examples, the image processing system 100 can perform various video and/or image processing tasks such as, for example, action recognition, object recognition, video compression, visual tracking, generating chroma keying effects, feature extraction, image recognition, machine vision, and/or any other image/video processing tasks.

In the example shown in FIG. 1, the image processing system 100 includes an image sensor 102, a storage 108, compute components 110, an image processing engine 120, one or more models 122, and a rendering engine 124. The image processing system 100 can optionally include another image sensor(s) 104 and/or one or more other sensors 106, such as an inertial measurement unit (IMU), a radar, an optical sensor, a light detection and ranging (LIDAR) sensing device, a motion sensor, and/or any other type of sensor. For example, in dual camera or image sensor applications, the image processing system 100 can include front and rear image sensors (e.g., image sensor 102 and/or image sensor 104).

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a television, a display device, a digital media player, a gaming console, a video streaming device, a smart wearable device, an autonomous system, a computer in a car, an IoT (Internet-of-Things) device, or any other suitable electronic device(s).

In some implementations, the image sensor 102, the image sensor 104, the other sensor 106, the storage 108, the compute components 110, the image processing engine 120, the one or more models 122 and/or the rendering engine 124 can be part of the same computing device. For example, in some cases, the image sensor 102, the image sensor 104, the other sensor 106, the storage 108, the compute components 110, the image processing engine 120, one or more models 122 and the rendering engine 124 can be integrated into a smartphone, laptop, tablet computer, smart wearable device, gaming system, camera system, and/or any other computing device. However, in some implementations, the image sensor 102, the image sensor 104, the other sensor 106, the storage 108, the compute components 110, the image processing engine 120, one or more models 122 and/or the rendering engine 124 can be part of two or more separate computing devices.

The image sensors 102 and 104 can be any image and/or video sensors or capturing devices, such as a digital camera sensor, a video camera sensor, a smartphone camera sensor, an image/video capture device on an electronic apparatus such as a television or computer, a camera, etc. In some cases, the image sensors 102 and 104 can be part of a camera or computing device such as a digital camera, a video camera, an IP camera, a smartphone, a smart television, a game system, etc. In some examples, the image sensor 102 can be a rear image capturing device (e.g., a camera, video, and/or image sensor on a back or rear of a device) and the image sensor 104 can be a front image capturing device (e.g., a camera, image, and/or video sensor on a front of a device). In some examples, the image sensors 102 and 104 can be part of a dual-camera assembly. The image sensors 102 and 104 can capture the image and/or video content (e.g., raw image and/or video data), which can then be processed by the compute components 110, the image processing engine 120, the one or more models 122 and/or the rendering engine 124 as described herein.

The other sensor 106 can be any sensor for detecting and measuring information such as distance, motion, position, depth, speed, light, sound, etc. Non-limiting examples of sensors include LIDARs, gyroscopes, accelerometers, magnetometers, IMUs, etc. In one illustrative example, the sensor 106 can be an IMU configured to sense or measure motion. In some cases, the image processing system 100 can include other sensors, such as a machine vision sensor, a smart scene sensor, a speech recognition sensor, an impact sensor, a position sensor, a tilt sensor, a light sensor, etc.

The storage 108 can be any storage device(s) for storing data, such as image or video data for example. Moreover, the storage 108 can store data from any of the components of the image processing system 100. For example, the storage 108 can store data or measurements from any of the sensors 102, 104, 106, data from the compute components 110 (e.g., processing parameters, output images, calculation results, etc.), and/or data from any of the image processing engine 120, the one or more models 122 and the rendering engine 124 (e.g., output images, processing results, etc.). In some examples, the storage 108 can include a buffer for storing data (e.g., image/video data) for processing by the compute components 110.

In some implementations, the compute components 110 can include a central processing unit (CPU) 112, a graphics processing unit (GPU) 114, a digital signal processor (DSP) 116, and/or an image signal processor (ISP) 118. The compute components 110 can perform various operations such as image recognition, optical flow estimation, supervised training (e.g., self-supervised training, semi-supervised training, mixed supervision training, etc.), video segmentation, image enhancement, object or image segmentation, computer vision, graphics rendering, augmented reality, image/video processing, compression, sensor processing, recognition (e.g., text recognition, object recognition, feature recognition, tracking, pattern recognition, action recognition, scene change recognition, etc.), disparity detection, video coding, machine learning, filtering, depth-of-field effect calculations or renderings, and/or any of the various operations described herein. In some examples, the compute components 110 can implement the image processing engine 120, the one or more models 122 and the rendering engine 124. In other examples, the compute components 110 can also implement one or more other processing engines.

Moreover, the operations for the image processing engine 120, the one or more models 122 and the rendering engine 124 can be implemented by one or more of the compute components 110. In one illustrative example, the image processing engine 120 and the one or more models 122 can be implemented by the CPU 112, the DSP 116, and/or the ISP 118, and the rendering engine 124 can be implemented by the GPU 114. In some cases, the compute components 110 can include other electronic circuits or hardware, computer software, firmware, or any combination thereof, to perform any of the various operations described herein.

In some cases, the compute components 110 can receive data (e.g., image data, video data, etc.) captured by the image sensor 102 and/or the image sensor 104, and process the data to generate output images or frames. In some examples, the compute components 110 can receive video data (e.g., one or more frames, etc.) captured by the image sensor 102, perform optical flow estimation, semi-supervised learning, self-supervised learning, mixed supervision learning, and/or any other video tasks. An image or frame can be a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture.

The compute components 110 can implement the image processing engine 120 and the one or more models 122 to perform various image/video processing operations. For example, the compute components 110 can implement the image processing engine 120 and the one or more models 122 to perform video tasks such as, for example, optical flow estimation, semi-supervised learning, self-supervised learning, mixed supervision learning, feature extraction, compression, recognition, computer vision tasks, detection tasks (e.g., object, action, gesture, face, human, scene, etc.), among others. The compute components 110 can process data (e.g., images, frames, videos, etc.) captured by the image sensors 102 and/or 104, data in storage 108, data received from a remote source (e.g., a remote camera, a server or a content provider), data obtained from a combination of sources, any combination thereof, and/or other data.

In some examples, the compute components 110 can perform semi-supervised learning, self-supervised learning, mixed supervision learning and optical flow estimation as described herein. In some cases, the compute components 110 can implement the one or more models 122 to perform semi-supervised learning, self-supervised learning, mixed supervision learning and optical flow estimation as described herein. In some examples, the one or more models 122 can include one or more neural networks. The one or more neural networks can include any network architecture such as, for example and without limitation, a convolutional neural network (CNN), a FlowNet network, a recurrent all-pairs field transforms (RAFT) network, among others.

While the image processing system 100 is shown to include certain components, one of ordinary skill will appreciate that the image processing system 100 can include more or fewer components than those shown in FIG. 1. For example, the image processing system 100 can include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the image processing system 100 is described below with respect to FIG. 17.

Optical flow is a dense (pixel-level) field carrying insights of motions over a sequence of frames. In some examples, optical flow can include a pattern of motion of objects, surfaces, edges, etc., in a visual scene. The motion can be caused by, for example, the relative motion between the observers and the scene. Optical flow can be used in a wide range of computer vision tasks, including autonomous driving, action recognition, object tracking, video segmentation, video compression, among others. In some cases, optical flow can assist with frame-to-frame motion insights to help in computer vision tasks on various devices such as, for example, handheld devices, mobile phones, personal computers, camera systems, etc.

Figure 2:
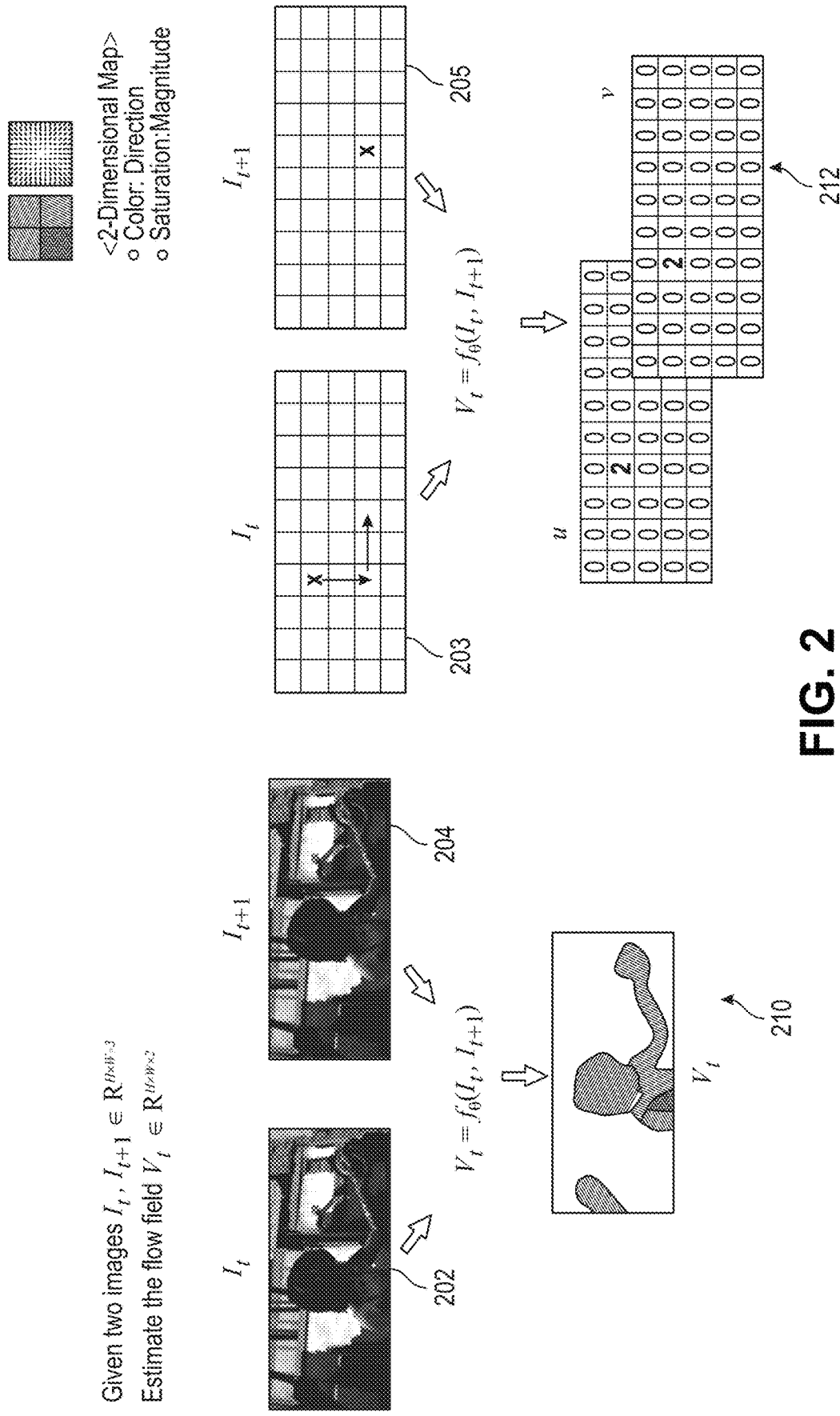
FIG. 2 is a diagram illustrating an example process of estimating optical flow, in accordance with some examples of the present disclosure.

FIG. 2 is a diagram illustrating an example process of estimating optical flow. As shown, given image ($I_t$) 202 and image ($I_{t+1}$) 204 $\in \mathbb{R}^{H \times W \times 3}$, the flow field $V_t \in \mathbb{R}^{H \times W \times 2}$ can be estimated as follows: $V_t = f_\ominus(I_t, I_{t+1})$. In some examples, flow estimation maps 210, 212 can be generated. A flow grid 203 for image ($I_t$) 202 shows movement (as arrows) of a point from a first position to a second position. A flow grid 205 for image ($I_{t+1}$) 204 shows the point at the second position. Flow estimation maps 210, 212 can include flow estimation data corresponding to direction and magnitude. For example, the flow estimation map 210 indicates that the point has moved two units (e.g., pixels or other unit) in a vertical (u) direction and the flow estimation map 212 indicates that the point has moved two units (e.g., pixels or other unit) in a horizontal (v) direction.

Figure 3A:
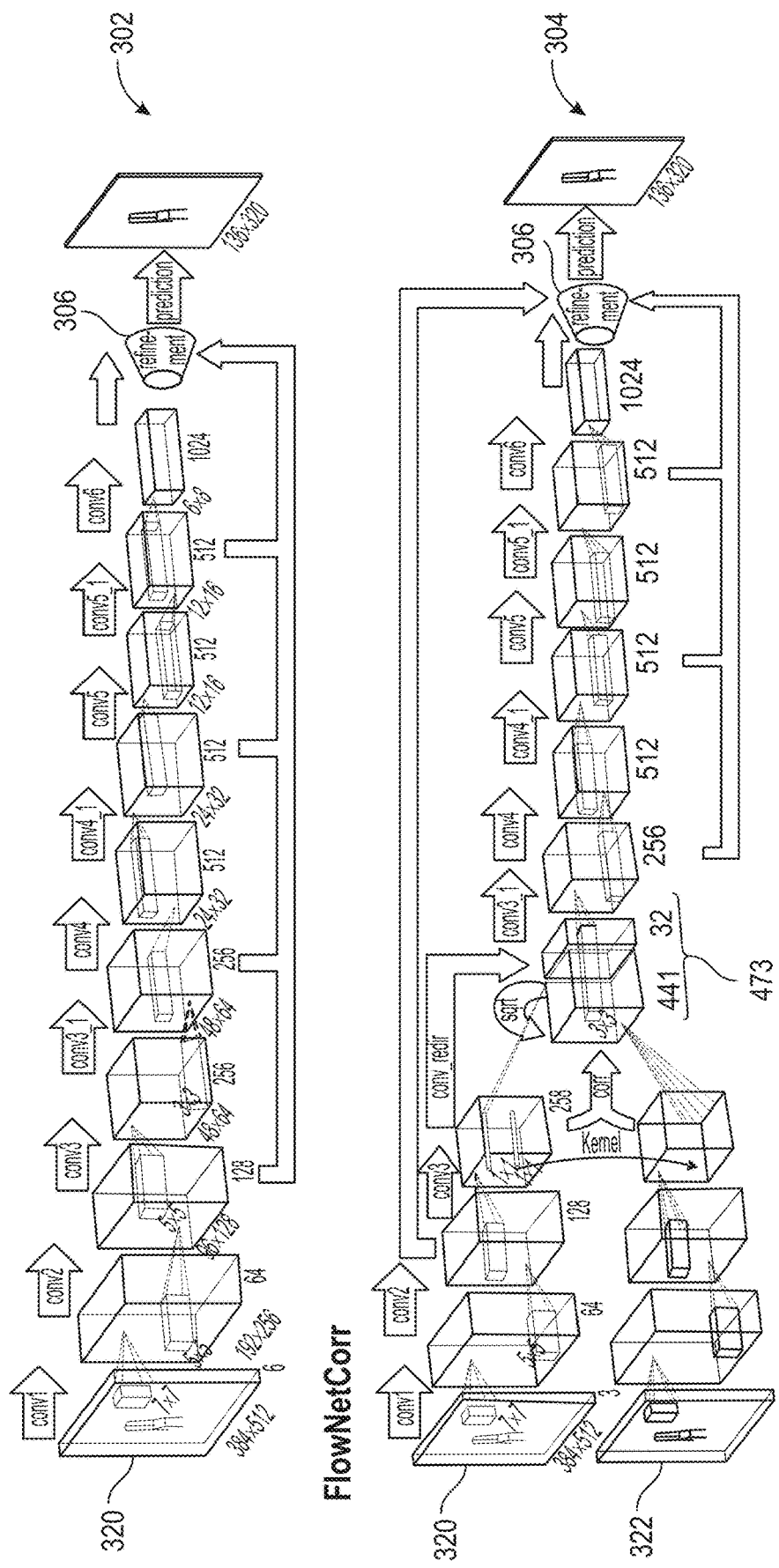
FIG. 3A-FIG. 3D are diagrams illustrating example model architectures for flow estimation, in accordance with some examples of the present disclosure.
Figure 3B:
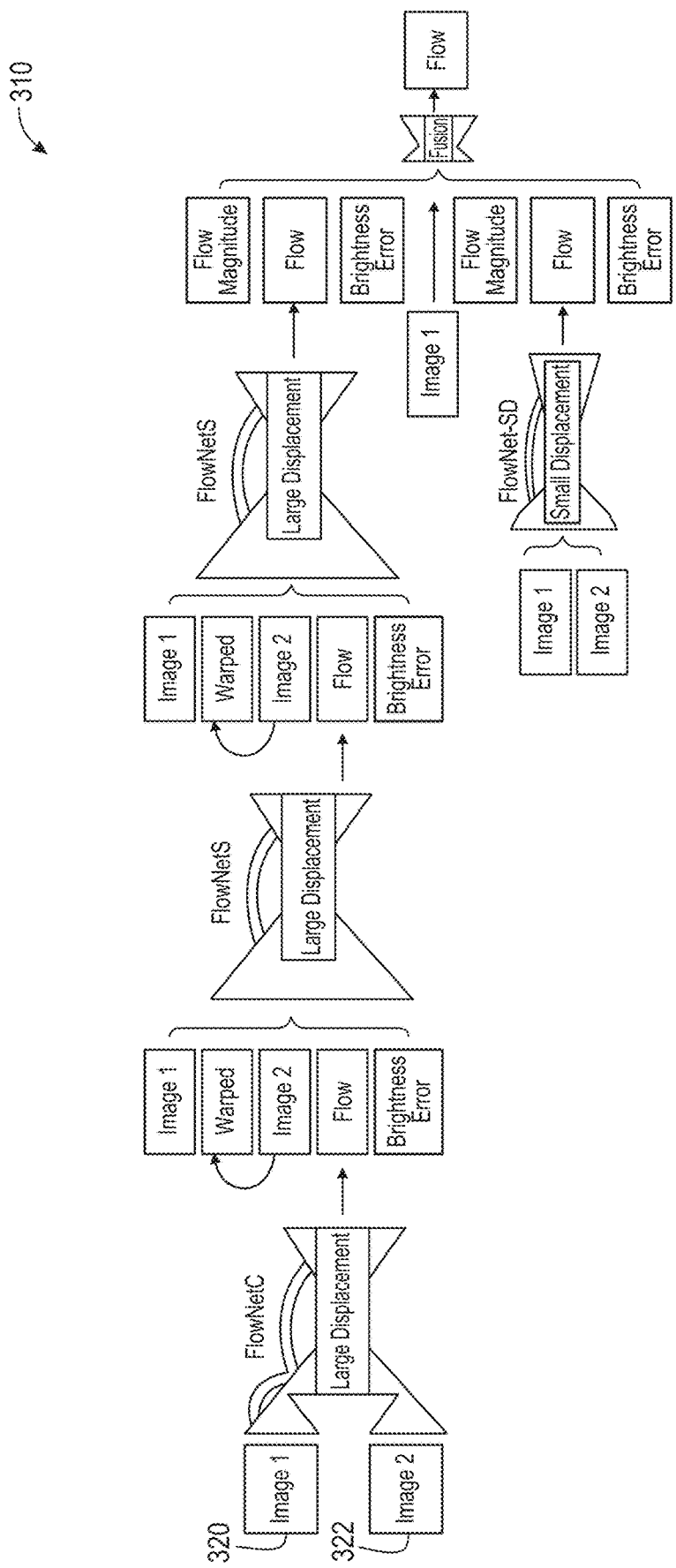

Various models can be implemented for flow estimation. FIG. 3A and FIG. 3B are diagrams illustrating example model architectures for flow estimation. Model 302 from FIG. 3A represents a FlowNetSimple model based on a CNN architecture, and model 304 from FIG. 3A represents a FlowNetCorr model based on a CNN architecture. The models 302 and 304 include a refinement portion 306, as further described herein. In some cases, the models 302 and 304 can be trained end-to-end. Model 302 is shown processing an image 320 and model 304 is shown processing an image 320 and an image 322.

As shown in FIG. 3B, model 310 includes a stacked architecture that includes warping of image 322 with intermediate optical flow. To compute large displacement optical flow, multiple FlowNets are combined in the model 310. In this example, braces indicate concatenation of inputs. Brightness error can be a difference between the image 320 and the image 322 warped with the previously-estimated flow. To deal with small displacements, smaller strides (e.g., an amount by which a filter is moved or iterated in a convolutional operation) are introduced in the beginning and convolutions between upconvolutions into the FlowNetSimple architecture (e.g., model 302). A fusion network is then applied to provide a final estimate.

Figure 3C:
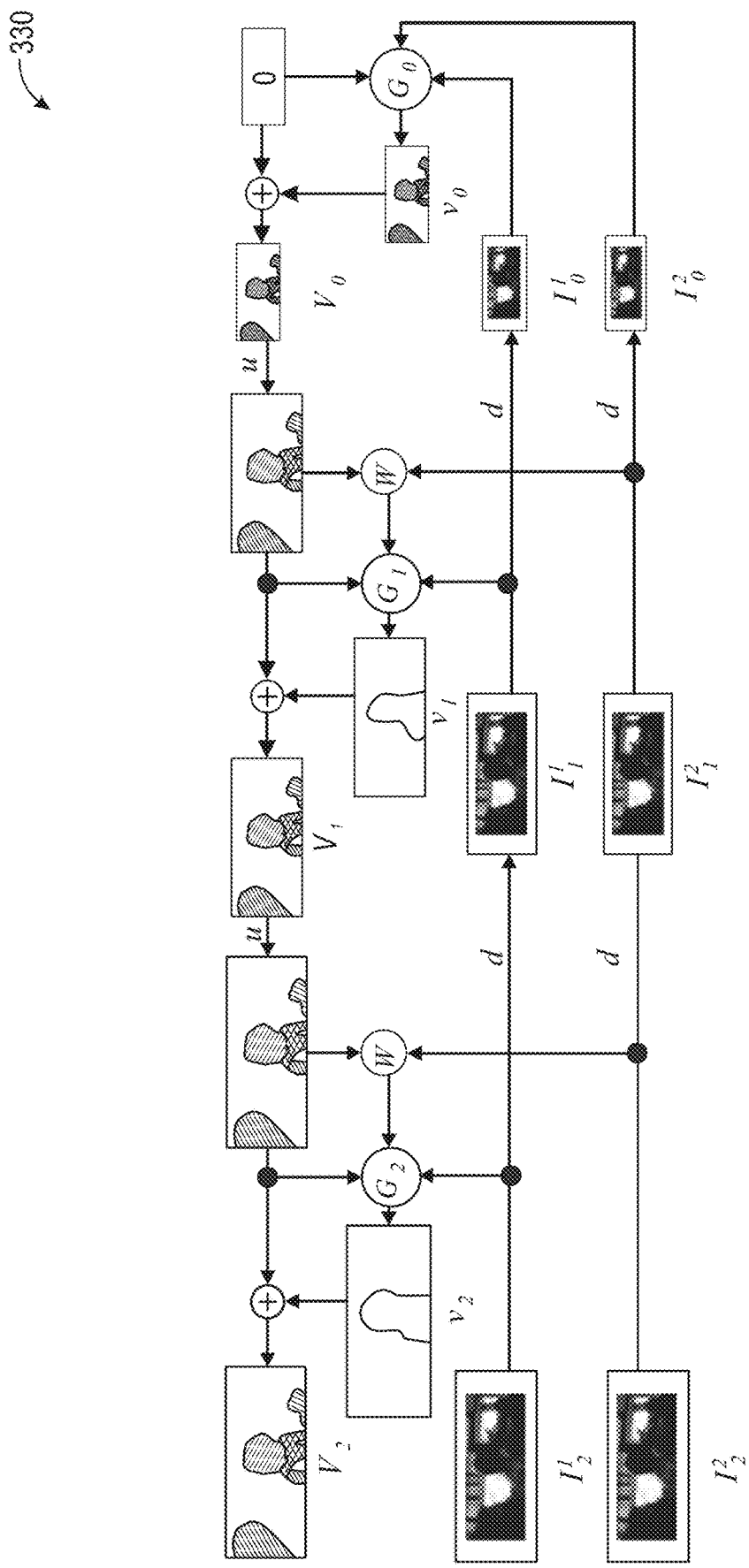
Figure 3D:
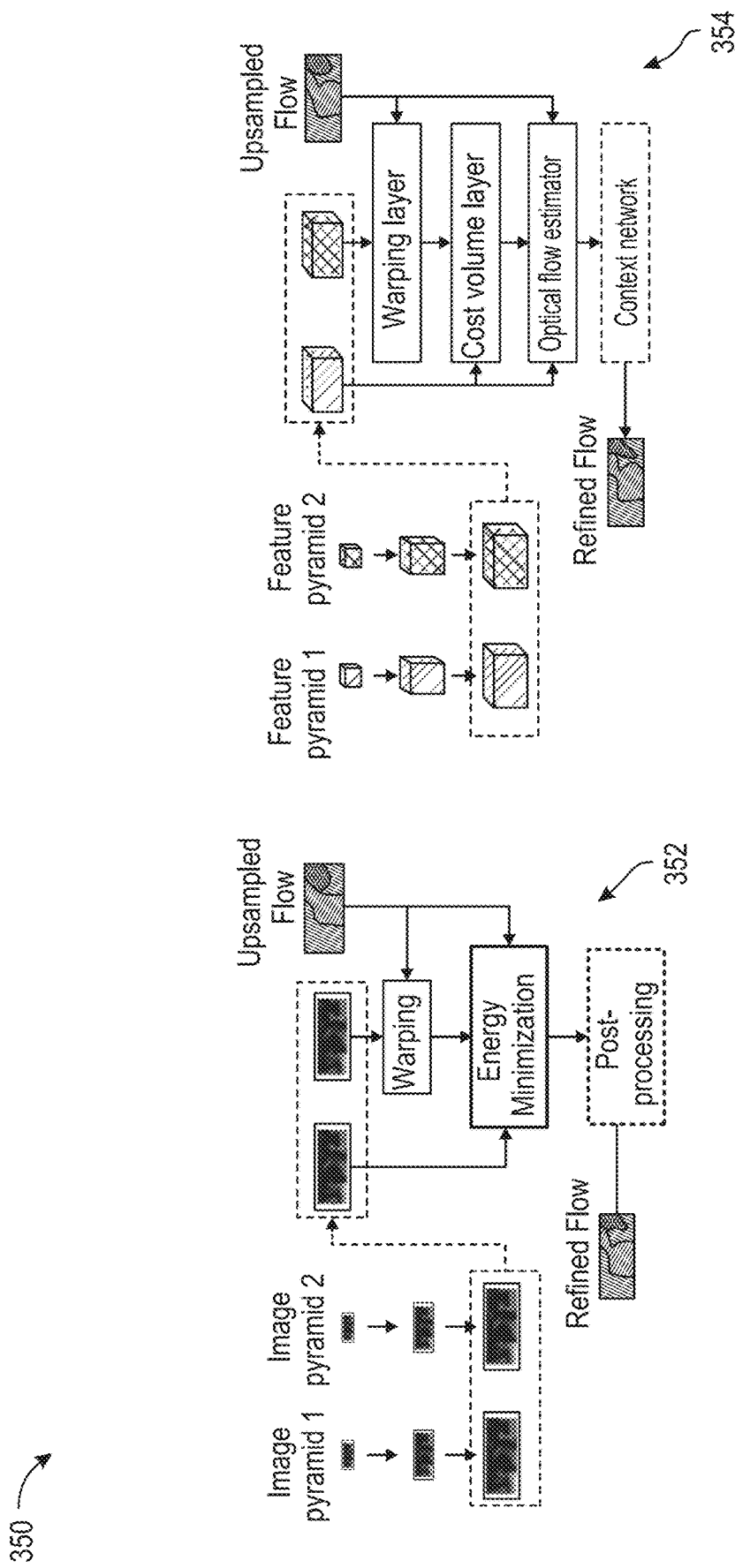

FIG. 3C and FIG. 3D are diagrams illustrating additional example model architectures for flow estimation. Model 330 of FIG. 3C is a 3-level pyramid network. A pyramid network (SpyNet) can combine coarse-to-fine pyramid methods with deep learning. In small image scales, the network can compute large displacements. Model 330 is shown performing inference (as compared to when the model 330 is being trained). A network $G_0$ of the model 330 can compute residual flow Do at the highest level of the pyramid (corresponding to a smallest image) using the flow resolution images $\{I_0^1, I_0^2\}$. At each pyramid level, a network $G_k$ of the model 330 can compute residual flow $v_k$, which propagates to each of the next lower levels of the pyramid to obtain a flow $V_2$ at the highest resolution.

Models 350 of FIG. 3D are convolutional neural networks (CNNs) for optical flow that uses pyramid, warping, and cost volume (e.g., a PWC-Net, with P corresponding to pyramid, W corresponding to warping, and C corresponding to cost volume). Models 350 include a model 352 that can implement a coarse-to-fine approach. Models 350 also include a model 354, which is a PWC-Net. In model 352, image pyramid and refinement is done at one pyramid level by performing energy minimization. In model 354, feature pyramid and refinement is done at one pyramid level by PWC-Net. PWC-Net warps features of a second image using the upsampled flow, computes a cost volume, and processes the cost volume using CNNs. Post-processing and the context network are optional. The arrows illustrated in FIG. 3D indicate the direction of flow estimation. Pyramids are constructed in the opposite direction of the arrows. In some examples, model 354 can implement the refinement portion 306 in models 302 or 304 shown in FIG. 3A.

Figure 4:
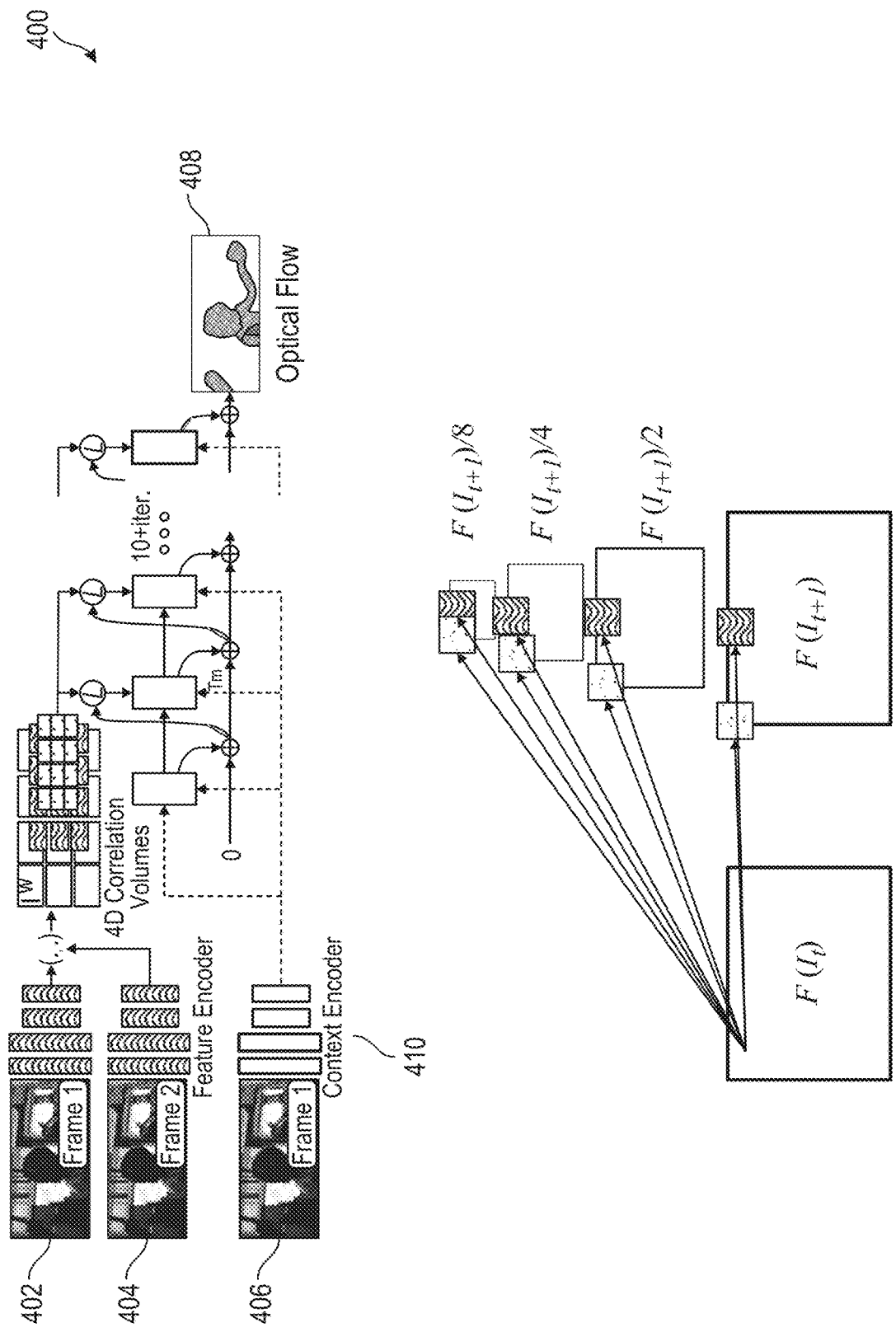
FIG. 4 is a diagram illustrating an example recurrent all-pairs field transform network architecture for optical flow, in accordance with some examples of the present disclosure.

FIG. 4 is a diagram illustrating an example recurrent all-pairs field transforms (RAFT) deep network architecture 400 for optical flow. As shown, a frame 402, a frame 404, and a frame 406 are processed by the network architecture 400 to generate an optical flow output 408. In some examples, the architecture 400 can perform feature extraction, compute visual similarities, and perform iterative updates. The visual similarities can include a correlation pyramid and a correlation lookup.

In some examples, RAFT considers the segment information using a context network 410. The pixels in one segment may have a similar flow. In consideration of this, the flow predicted incorrectly in the occlusion area is refined. However, in some cases, as shown in FIG. 5, even a small portion of a matched part in an image may be incorrectly refined when most of the area is occluded, resulting in poor performance. For example, referring to FIG. 5, the predicted optical flow 508 generated by a machine learning model 506 (e.g., a RAFT neural network, such as that shown in FIG. 4) may have inaccuracies resulting from incorrect refinement of matched parts between images 502 and 504 when a large part of image 504 is occluded as shown in FIG. 5.

Moreover, in some cases, while the optical flow in a minor area of an image (e.g., less than 50% of the image) can be changed to the optical flow in a major area of an image (e.g., greater than 50% of the image), there may not be consideration regarding whether the major area is occluded. For example, FIG. 6A is a diagram showing a minor occlusion scenario 600. FIG. 6B is a diagram showing a major occlusion scenario 610. In the minor occlusion scenario 600, an image 604 ($I_{t+1}$) includes a smaller occlusion 608 relative to image 602 ($I_t$). As shown in image 606, most of the pixels (corresponding to unoccluded pixels, shown in FIG. 6A with hatched lines) in a segment are determined correctly. However, a number of pixels (corresponding to occluded pixels, shown in FIG. 6A with horizontal lines) in a segment are determined incorrectly. With reference to FIG. 5, in some cases, the ground truth 510 and the machine learning model 506 (e.g., a RAFT network) can help refine the minor area in the smaller occlusion (e.g., smaller occlusion 608 shown in FIG. 6A).

In the major occlusion scenario 610 shown in FIG. 6B, the image 604 includes a larger occlusion 612 relative to image 602. As shown, most of the pixels in image 606 are incorrect (corresponding to occluded pixels, shown in FIG. 6B with horizontal lines), and the correctly predicted area (corresponding to unoccluded pixels, shown in FIG. 6B with hatched lines) would be changed according to the incorrectly predicted area. The self-supervised learning approaches described herein can address these and other issues.

Moreover, with reference to FIG. 5, a ground truth 510 of the optical flow may include or be based on the sequence of images 502 and 504. However, in some examples, there can be additional sequences of images, and the additional sequences of images can be used to train the machine learning model 506 (e.g., a RAFT network). The additional sequences of images can train a machine learning model 506 for a larger displacement. The additional sequences of images can also take advantage of semi-supervised learning.

As previously noted, another challenge in optical flow relates to the availability of data (e.g., for training) being limited. Since pixel-level annotations can be very expensive, most datasets only provide a ground truth between consecutive images $I_t$ and $I_{t+1}$. For example, in FIG. 7, datasets may only provide a ground truth 720 between images 702 and 704, 704 and 706, 706 and 708, and 708 and 710. Also, the image frequency rate of the datasets may be different for each dataset. For example, as noted above the MPI Sintel Flow dataset includes of 24 FPS, while the KITTI dataset includes 10 FPS.

However, as shown in FIG. 7, there are other possible data pairs of various images. For example, in addition to data pairs of images 702 and 704, there can be data pairs of images 702 and 706, images 702 and 708, image 702 and 710, among others. Using additional data pairs accordingly can provide advantages of semi-supervised learning and enable data learning of various frequency rates.

The systems and techniques described herein can implement self-supervised learning, semi-supervised learning, mixed supervision learning and occlusion masking for more accurate and higher quality optical flow estimation. As previously explained, flow estimation can suffer performance issues caused by occlusions and/or limited datasets. Optical flow data annotation can include per-pixel values (e.g., for floating-point displacements in X and Y dimensions) and can be expensive and difficult. Datasets can include real-world image data and/or synthetic image data (e.g., computer generated such as animations). Real-world datasets have very limited number of training samples due to the difficulty in data annotation. Synthetic datasets are generally animation-based and can have exaggerated and unrealistic object and scene movements. The synthetic datasets can cause poor performance when used for training. For example, due to issues such as domain shifts, reliance on synthetic datasets for trainings can yield sub-optimal results.

In some examples, a self-supervised learning process can be implemented for solving occlusion problems. In some cases, a semi-supervised learning process can be implemented using various data pairs. In some self-supervised learning examples, an occlusion can be generated and applied to an image in consecutive images ($I_t$, $I_{t+1}$). An additional channel can be added to predict a matching map. In some examples, a matching area between sequential images can be predicted using self-supervised learning. In some cases, a pseudo-occlusion ground truth can be generated from the difference between the image $I_t$ and a warped image ($I_t(x; y)$, $I_{t+1}(x+V_t(u), y+V_t(v))$). The area where the difference between the two images is large (e.g., greater than a threshold difference, such as 10%, 20%, etc.) can be set as the occlusion area and excluded from training to perform training on the better-mapped or better-mapping area. The difference between the image $I_t$ and the warped image $I_{t+1}$ may be a very small value in some cases. However, errors may exist because of differences in light or changes in values in continuous space. A occlusion threshold can be set. The occlusion threshold can be heuristic, can be trained directly, and/or otherwise determined. Data can be created by directly creating occlusions and using the occlusions in training.

For example, self-supervised learning can be used to set pretext tasks for unlabeled data and can use the pretext tasks to train the neural network. The trained network can help enable higher-level scene understanding. For example, a network f( ) can predict y class from input data x as follows: $y \leftarrow f(x)$. In some cases, the image can be rotated randomly (z), and this rotation prediction ($\tilde{z}$) can be computed simultaneously with the classification prediction ($\tilde{y}$) as follows:

$$x \Rightarrow \gamma(x) \begin{cases} \tilde{y} \leftarrow f(\gamma(x)) \\ \tilde{z} \leftarrow f(\gamma(x)) \end{cases}.$$

Figure 8:
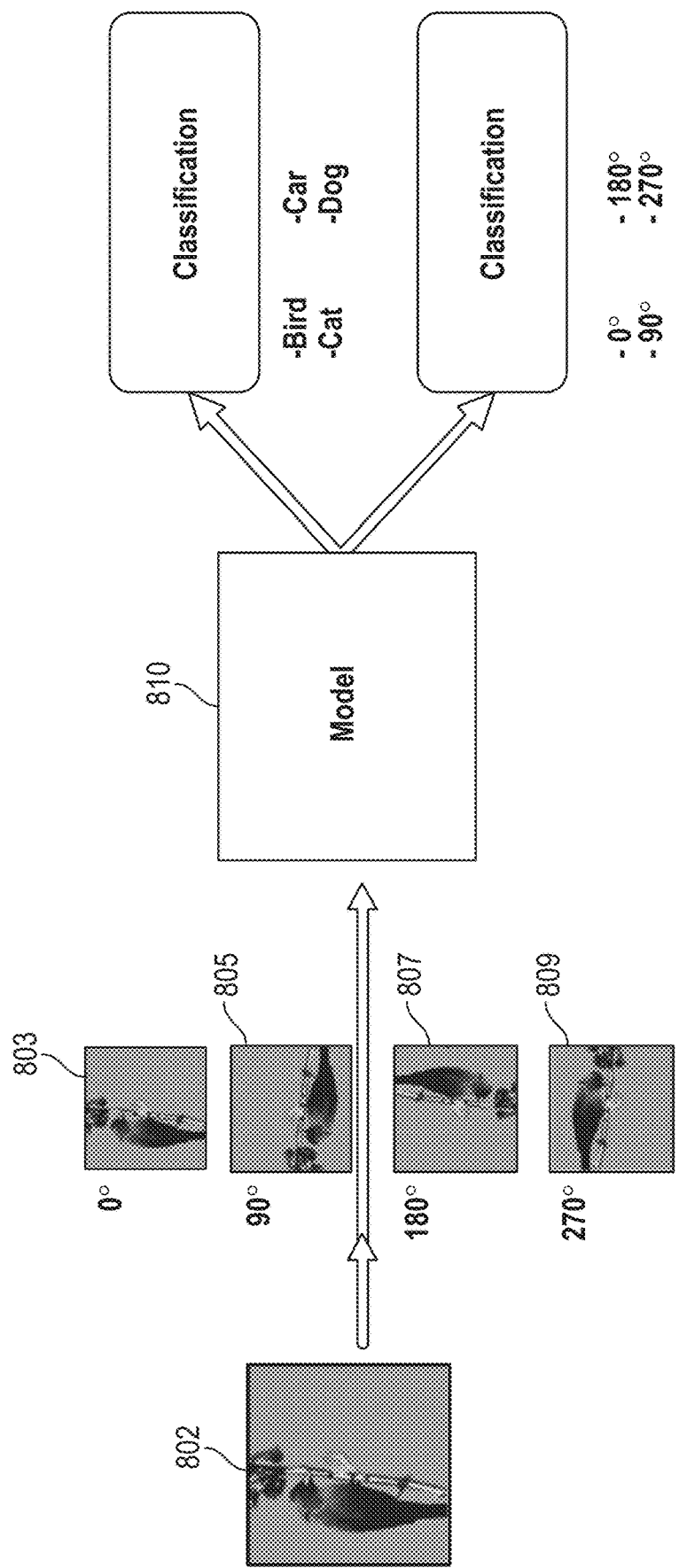
FIG. 8 is a diagram illustrating of an example model trained with an image rotated to generate classification predictions, in accordance with some examples of the present disclosure.

If the network is not only trained using classification but also using the image rotated by various amounts, the network can be trained to better understand the image at a high level. For example, FIG. 8 shows a diagram illustrating of an example model 810 trained with an image 802 rotated at 0 degrees (rotated image 803), 90 degrees (rotated image 805), 180 degrees (rotated image 807), and 270 degrees (rotated image 809) to generate classification predictions.

In a semi-supervised learning example, a consistency regularization process can be used for semi-supervised learning. The consistency regularization process can be used in classification. The consistency regularization process can perform well in regression. In some examples, a rotation consistency-based semi-supervised learning process can be implemented for computing optical flow. For example, a horizontal flip and random rotation can be used for the semi-supervised learning. After applying a horizontal flip and/or random rotation to the rotated images ($R(I_t)$, $R(I_{t+k})$), the output ($R(\tilde{V})$) of the neural network can be restored ($R^{-1} R(\tilde{V})$). In some examples, the output can be the same or similar to the output of the original values ($\tilde{V}$). In some examples, the rotation and restored output can be applied to enable learning between images ($I_t$), ($I_{t+k}$).

Figure 9:
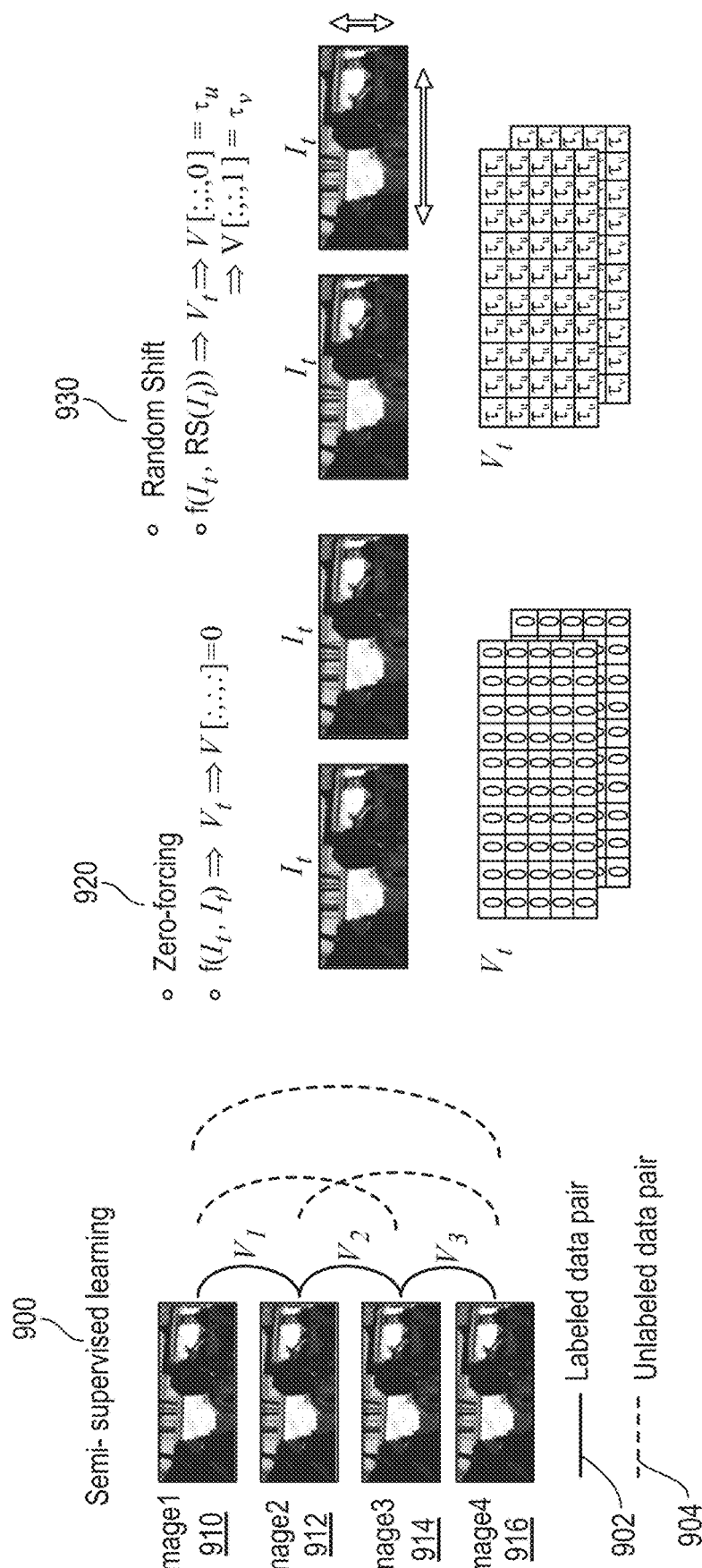
FIG. 9A illustrates labeled and unlabeled pairs of frames for supervised learning in optical flow, in accordance with some examples of the present disclosure.
FIG. 9B is a diagram illustrating example zero-forcing and random shifting implemented for supervised learning in optical flow, in accordance with some examples of the present disclosure.

In some examples, semi-supervised learning can be used to reduce large annotation costs. As shown in FIG. 9A, in some cases, an example semi-supervised learning process 900 can improve performance by using both labeled data 902 and unlabeled data 904. In some cases, semi-supervised learning can be used in classification.

In one illustrative example, semi-supervised learning can implement a consistency regularization algorithm. The consistency regularization method can be simple and can provide good performance. Consistency regularization can provide various perturbations to the same data(x) and make each output the same, e.g., x⇒(x,x'), $L_U$=d(f(x), f(x')). Applying the consistency regularization can help improve the performance by smoothing the manifold. In some examples, the decision boundary can traverse the low-density area. $L_U$ can to help traverse the low-density area in the unlabeled data distribution, and not the low-density area in the labeled data distribution. The total loss can be applied with the consistency regularization loss is as follows: $L_{total}=L_S+w(t)*L_U$.

Figure 10:
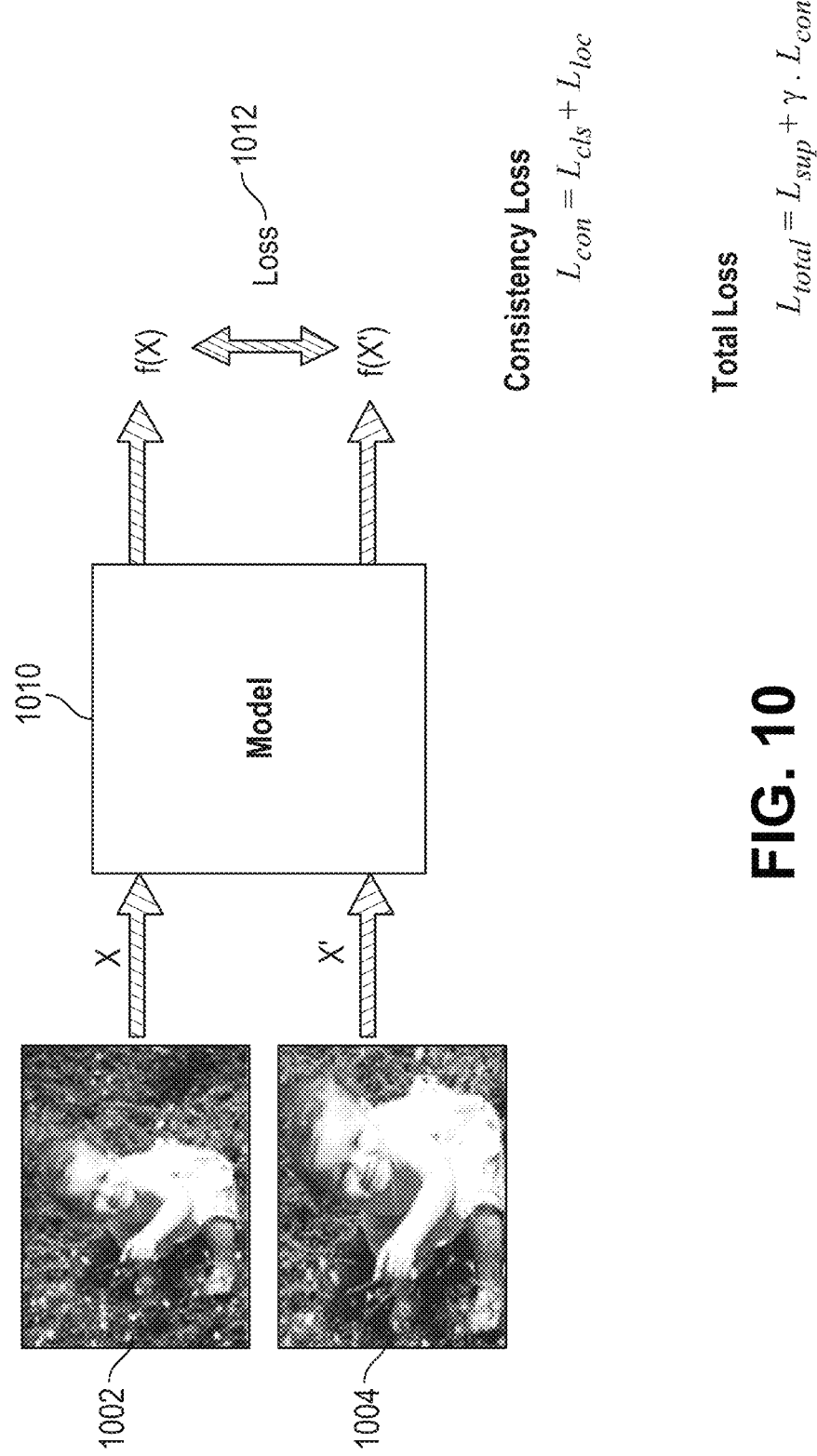
FIG. 10 illustrates an example semi-supervised learning using consistency regulation, in accordance with some examples of the present disclosure.

Semi-supervised learning can be applied to classification as well as other fields, such as object detection. For example, consistency-based semi-supervised learning for object detection can allow consistency regularization loss to perform well not only for classification but also for localization. FIG. 10 illustrates an example of performing semi-supervised learning using consistency regulation. As shown, using consistency regularization, model 1010 can identify a loss 1012 for images 1002 and 1004. In some examples, the consistency loss $L_{con}$ can equal Lcls+$L_{loc}$, and the total loss $L_{total}$ can equal $L_{sup}+\gamma*$Lcon. In some cases, unlabeled data with consistency regularization can push the decision boundary to low density regions. The consistency regulation can help with classification as well as regression.

With self-supervised learning, semi-supervised learning, and/or mixed supervision learning, an optical flow ($V_t$) can be predicted between images ($I_t$, $I_{t+1}$). The images can include three channels (I∈$\mathbb{R}^{3\times w\times h}$), such as red, green, and blue (RGB) channels. Optical flow can include u, v channels (V∈$\mathbb{R}^{2\times w\times h}$) that move along the x and y axes, respectively. In an example self-supervised learning scenario, an occlusion and random shift method can be used to train more diverse pairs of images. The occluded images and occlusion masks are denoted as O(I) and m(O), respectively. The random shift can be denoted as RS(·). In the self-supervised learning scenario, a horizontal flip and random rotation of one orm ore images can be implemented. A horizontally flipped image can be denoted as H(I) and a randomly rotated image can be denoted as R(I). The restoration of the horizontally flipped and randomly rotated image can be represented as $H(·)^{-1}$, $R(·)^{-1}$. Also, each of the predictions can be represented by tilde (~).

In some self-supervised learning scenarios, a ground truth of a matching map can be generated using the same image. For example, if the optical flow of the same image ($I_t$, $I_t$) is determined, the optical flow ($V_t$) should be zero. Even if occlusion is added to one image, the optical flow should be zero, such as based on the following: RAFT ($I_t$, $I_t$)=$\tilde{V}_t$≈0; and RAFT ($I_t$, O($I_t$))=$\tilde{V}_t$≈0.

By applying the generated occlusion to an image, a ground truth of a matching map (m(O)) and an occluded image can be created. The output of the network can be changed from two channels (V∈$\mathbb{R}^{2\times w\times h}$) to three channels (V∈$\mathbb{R}^{3\times w\times h}$), and an occlusion can be predicted in an additional channel (V∈$\mathbb{R}^{1\times w\times h}$) By training these matching areas, a network can be trained with a higher level of scene understanding regarding which parts are matched and unmatched. In addition, by calculating the predicted matching map (e.g., in a gated recurrent unit (GRU)), refinement of the occlusion area can be continuously possible. The matching loss can be calculated by the generated pseudo ground truth and the prediction, and the total loss can include the sum of the RAFT loss and matching loss as follows: $L_{match}$=CE(m(O), m($\tilde{O}$)); $L_{total}=L_{RAFT}+\alpha_1 \cdot L_{match}$.

Figure 11:
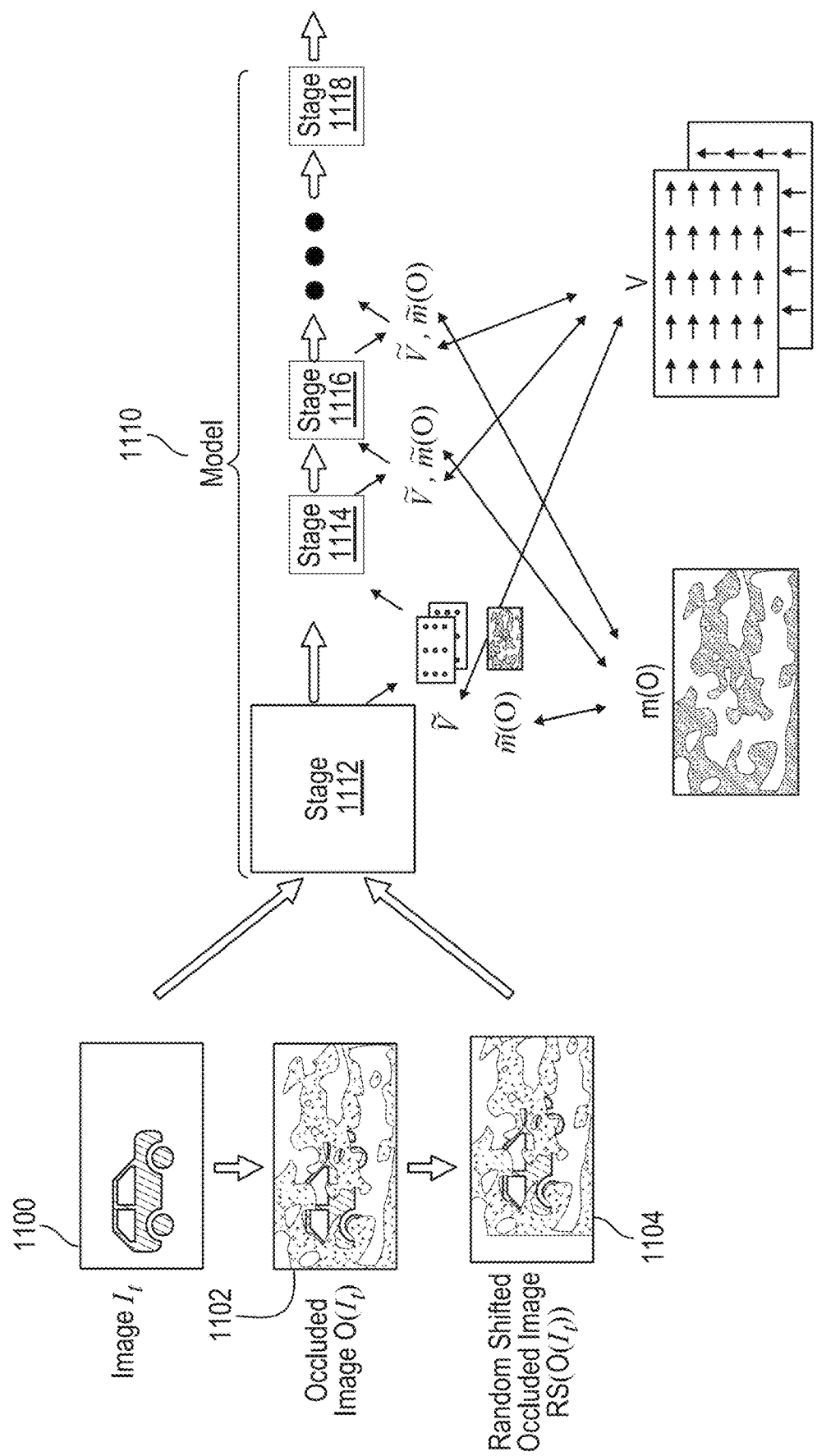
FIG. 11 is a diagram illustrating an example process for self-supervised learning, in accordance with some examples of the present disclosure.

FIG. 11 illustrates an example process for self-supervised learning. In this example, the model 1110 can process an image 1100 (denoted in FIG. 11 as image $I_t$), an occluded image 1102 (denoted in FIG. 11 as occluded image O($I_t$)), and a randomly-shifted occluded image 1104 (denoted in FIG. 11 as randomly-shifted occluded image RS(O($I_t$)). The model 1110 can include stages 1112, 1114, 1116, and 1118. The stages 1112, 1114, 1116, and 1118 can generate an optical flow map (V) and a matching map (m(O)) using the occluded image 1102 and the random shifted occluded image 1104 as input.

Figure 12A:
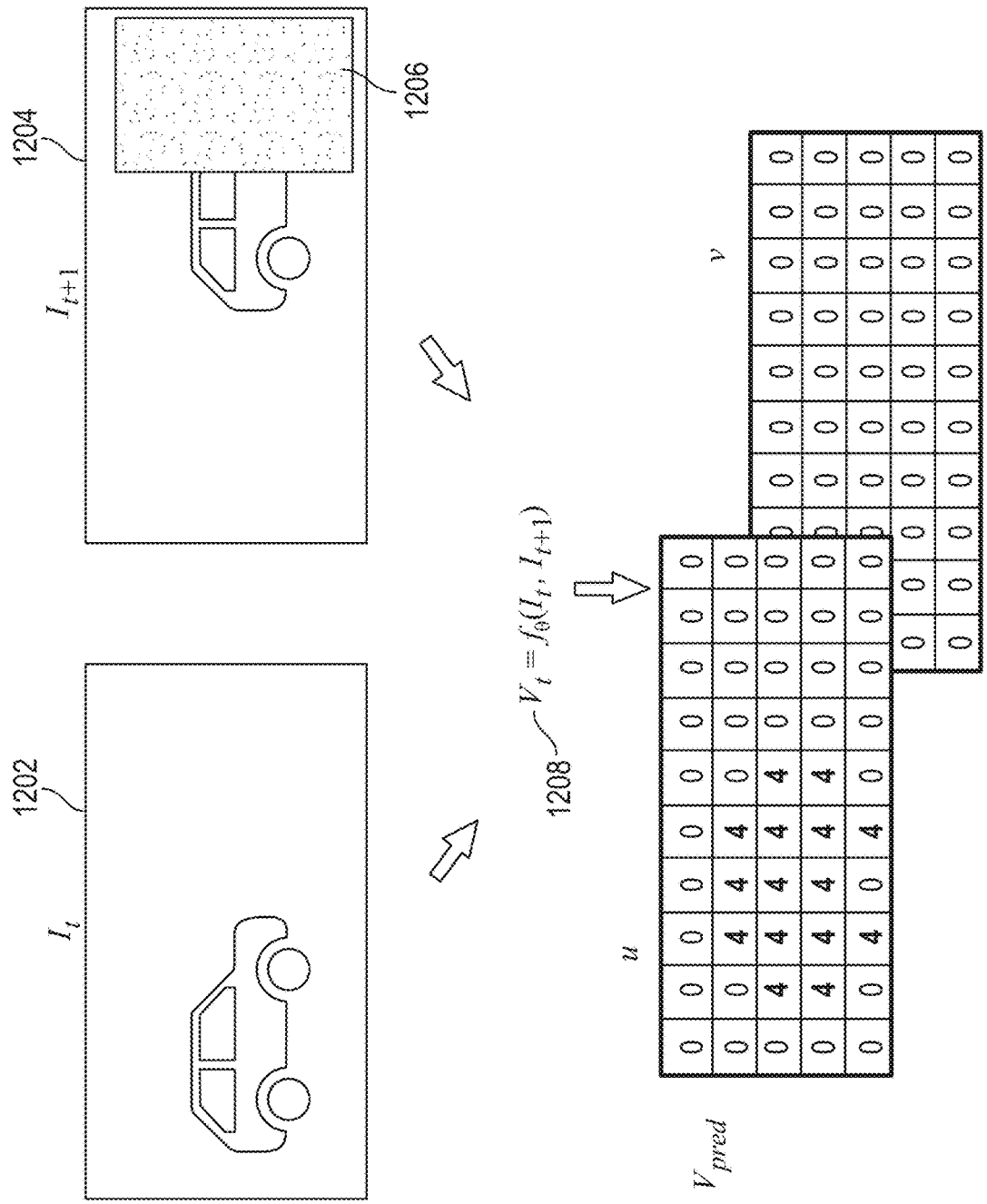
FIG. 12A-FIG. 12C are diagrams illustrating examples of using segment information to train a model for flow estimation by considering occlusions, in accordance with some examples of the present disclosure.
Figure 12B:
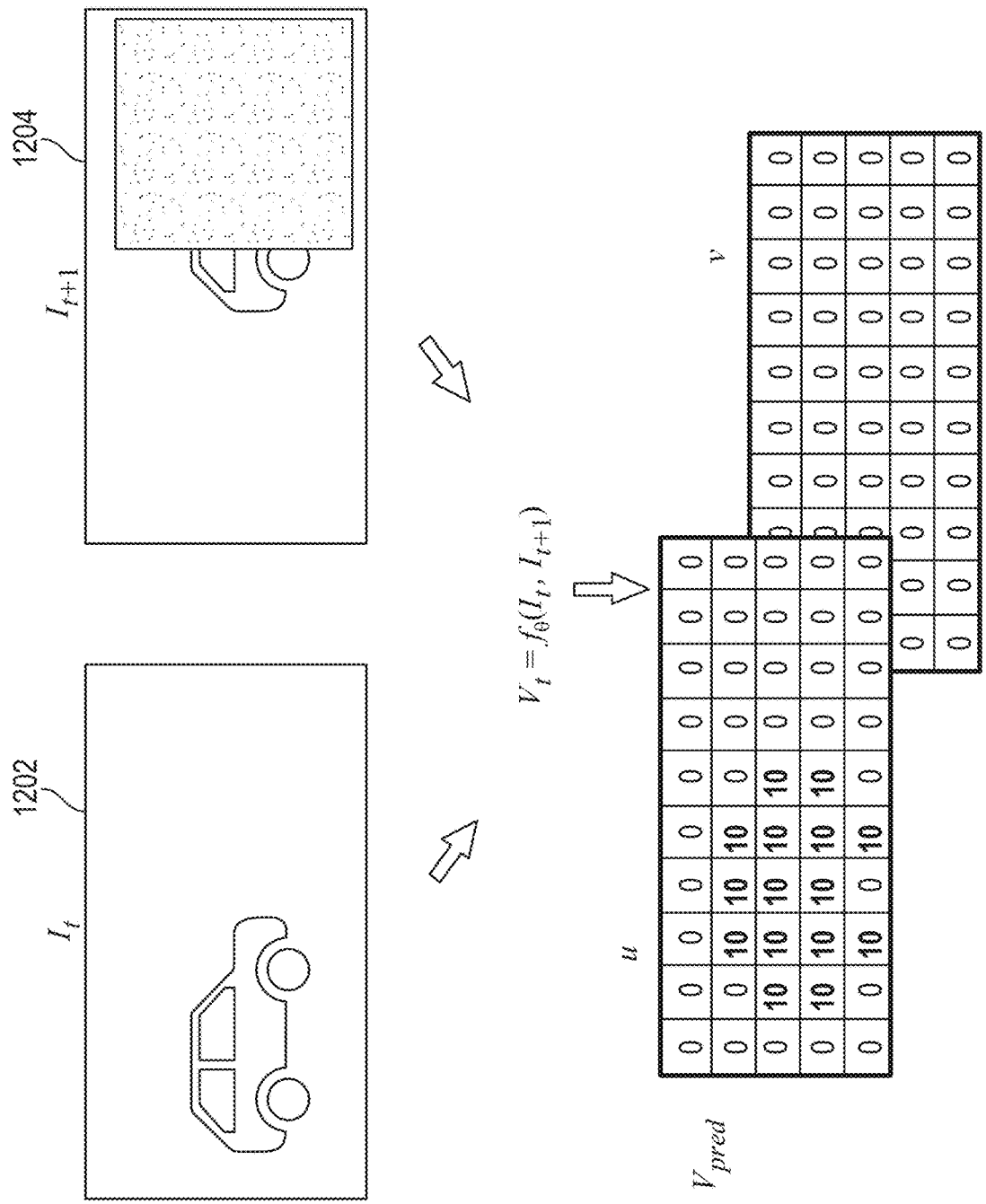
Figure 12C:
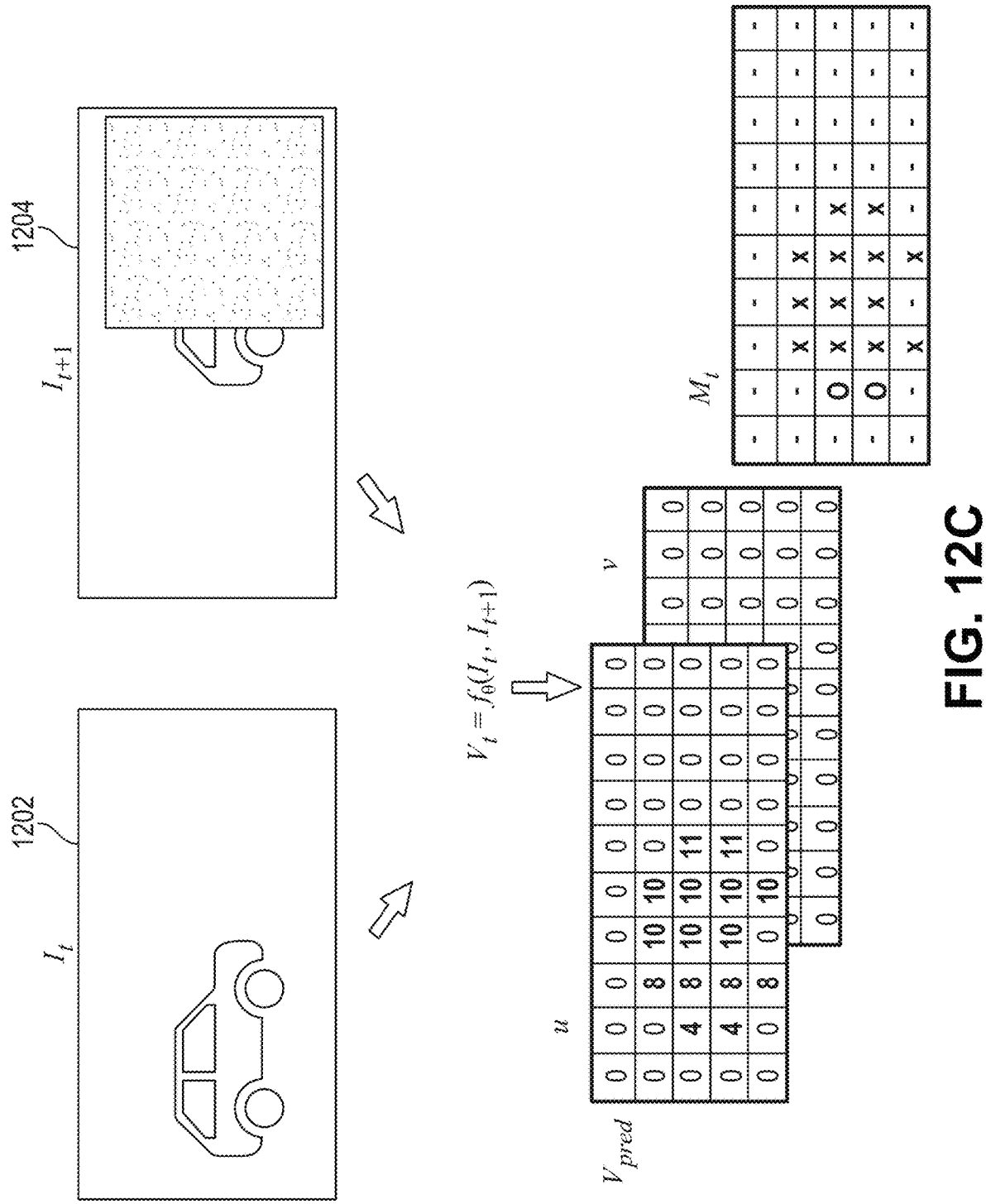

In some examples, as shown in FIG. 12A, segment information can be used to train the model by considering occlusion rather than ignoring the occlusion. An occluded area 1206 in an image 1204 can be refined using segment information. An optical flow 1208 can be generated based on an image 1202 and an occluded image 1204. If the occluded area 1206 in the image 1204 occupies a large portion of the image 1204, the well-fitting area may be incorrectly changed, as shown in FIG. 12B. However, as shown in FIG. 12C, a learnable matched map ($M_t$) can be used to predict which pixels are matched and which are not.

In semi-supervised learning, the labeled data can include continuous frame data. However, as described herein, semi-supervised learning can be used to train more diverse pairs of images, such as based on the following:

$$(I_t, I_{t+k}) = \begin{cases} \text{labeled pair, if } k = 1 \\ \text{unlabeled pair, otherwise} \end{cases}.$$

When there are image pairs $I_t$ and $I_{t+k}$, labeling may exist only when k is 1. In some examples, a proposed loss can enable training even in image pairs with k exceeding 1. A consistency regularization of semi-supervised learning can be implemented and can have applied horizontal flip and random rotation to give perturbation.

Figure 13A:
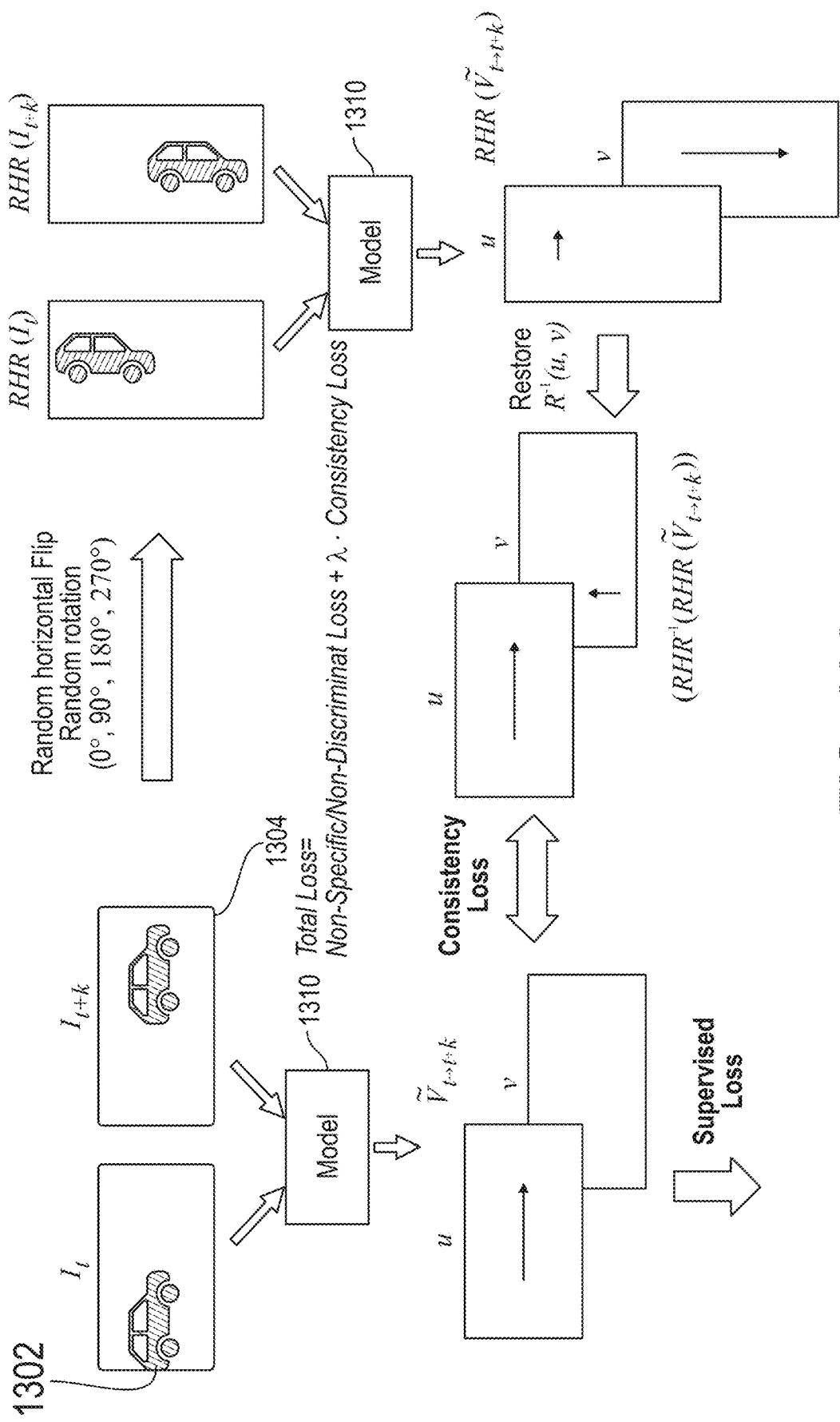
FIGS. 13A and 13B are diagrams showing examples of semi-supervised learning for optical flow, in accordance with some examples of the present disclosure.
Figure 13B:
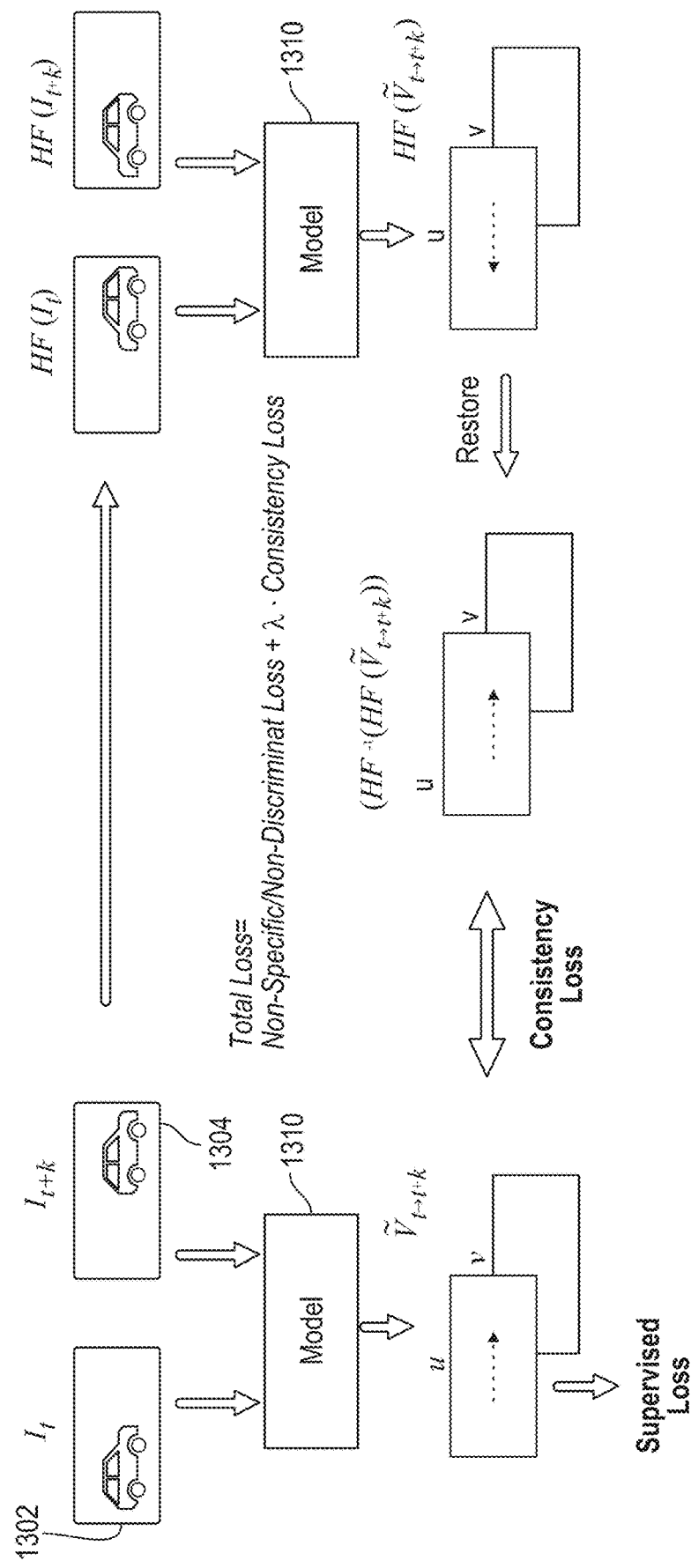

FIG. 13A and FIG. 13B 13B are diagrams showing examples of semi-supervised learning for optical flow. In the examples of FIG. 13A and FIG. 13B, horizontal flip (e.g., 0 degrees, 90 degrees, 180 degrees, 270 degrees, etc.) and/or random rotations can be applied to image 1302 ($I_t$) and image 1304 ($I_{t+k}$). In some examples, a horizontal flip and/or random rotations can be applied to images 1302 ($I_t$) and 1304 ($I_{t+k}$), such as based on the following:

$$I_t,I_{t+k}\Rightarrow H(I_t,H(I_{t+k});I_t,I_{t+k}\Rightarrow \mathbb{R}(I_t,R(I_{t+k}).$$

After the image 1302 and/or 1304 are flipped and/or rotated, the output of $I_t$ and $I_{t+k}$ and the output of H($I_t$) and H(It+k) (or R($I_t$) and R(It+k)) can be calculated from the same model 1310, such as based on the following: $\tilde{V}$=RAFT ($I_t$, $I_{t+k}$); H($\tilde{V}$)=RAFT(H($I_t$), H ($I_{t+k}$)); R($\tilde{V}$)=RAFT(R($I_t$,$I_t$), R($I_t$,$I_{t+k}$)).

In some cases, an inverse to the output H($\tilde{V}$) or R($\tilde{V}$) can be applied. In such cases, restoration can be applied. $H^{-1}$(H($\tilde{V}$)) can be the same as $\tilde{V}$ (e.g., it is the same rotation), and a loss to reduce the difference between two predictions can be defined as follows: $l_u=\|\tilde{V}-H^{-1}(H(\tilde{V}))\|_2^2$; $l_u=\|\tilde{V}-R^{-1}(R(\tilde{V}))\|_2^2$.

If there is a large difference in value ($l_u$), the loss would diverge. Therefore, in some examples, the following constraint can be added to prevent such divergence:

$$m = \begin{cases} 1, \text{ if } l_u < \epsilon \\ 0, \text{ otherwise} \end{cases}.$$

In some cases, the expectation is taken only for the positive mask. An unsupervised loss term $L_U$ can be defined as $L_U = \mathbb{E}_{II\{m=1\}}(l_u)$. Therefore, supervised loss ($L_S$) can be applied for labeled data. The unsupervised loss ($L_U$) can be applied for unlabeled data. The overall loss can be as follows: Ltotal=$L_S$+$\alpha_2 \cdot L_U$. The overall loss can also be represented as Total Loss=RAFT Loss+$\gamma$*Consistency Loss (where the consistency loss can be an unsupervised loss), as shown in FIG. 13A and FIG. 13B.

Figure 14:
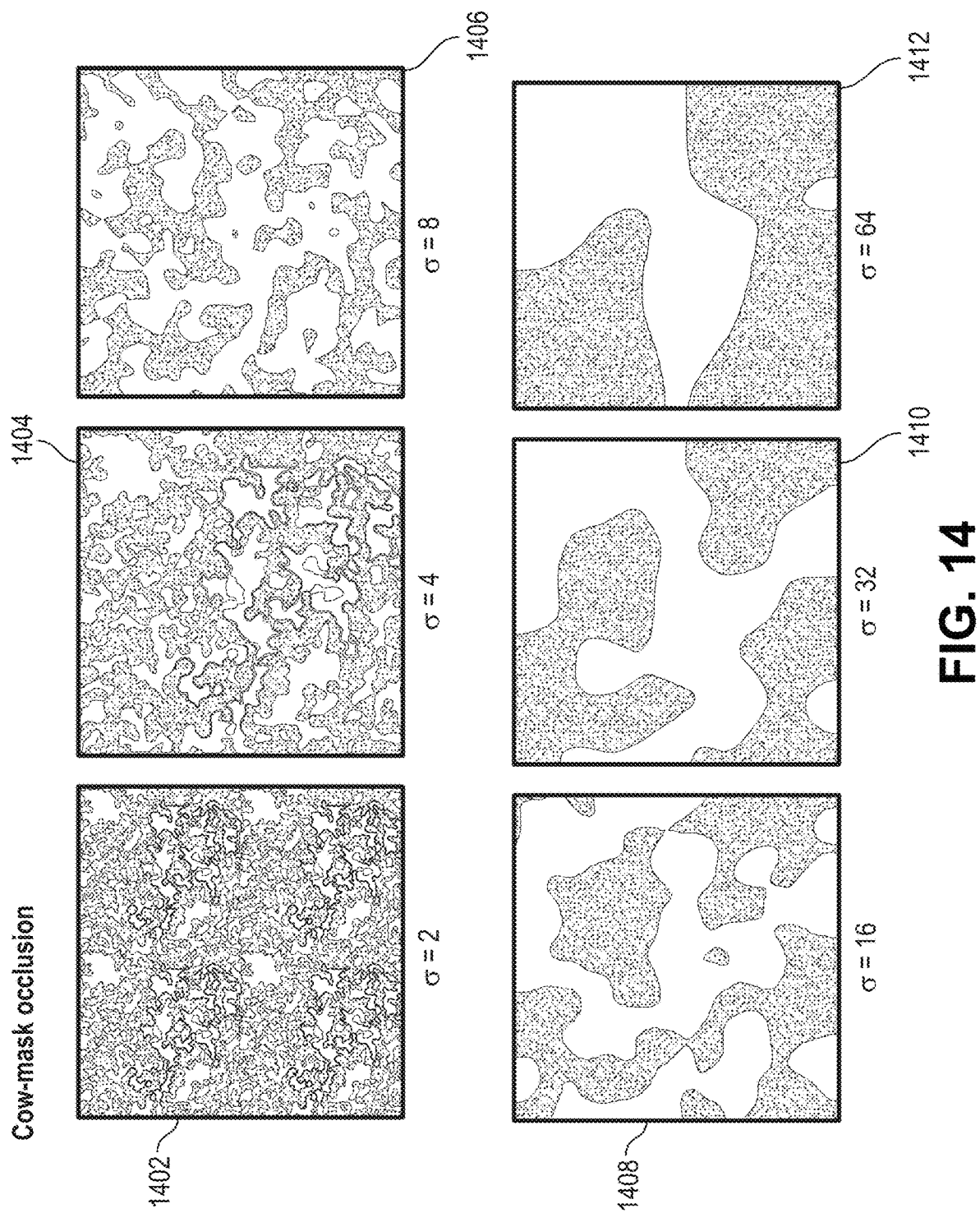
FIG. 14 shows example cow-mask occlusions for supervised learning for flow estimation, in accordance with some examples of the present disclosure.

FIG. 14 shows example cow-mask occlusions 1402, 1404, 1406, 1408, 1410, and 1412 that can be applied. In some examples, cow-masks occlusions 1402-1412 can be used to implemented occluded images for supervised learning for optical flow as previously explained. The cow-mask occlusions 1402-1412 can include different sizes, shapes, and/or configurations. In some examples, a performance and robustness can be enhanced using parametric random occlusions with arbitrary shapes and/or sizes.

Figure 15:
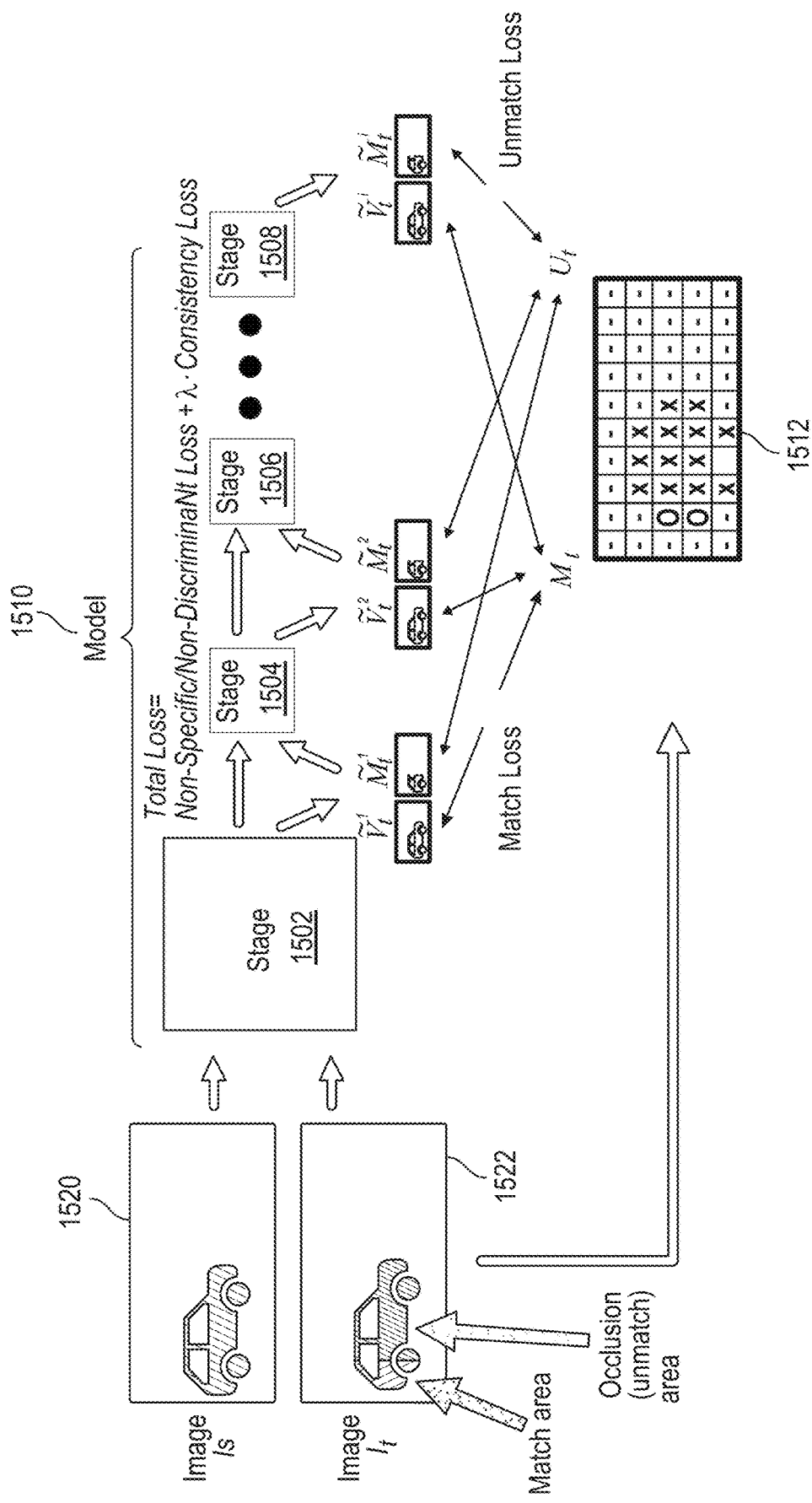
FIG. 15 shows a diagram of an example self-supervised learning process for optical flow; in accordance with some examples of the present disclosure

FIG. 15 shows a diagram of an example self-supervised learning process for optical flow. An image 1520 and an occluded image 1522 can be processed at each stage (of multiple stages 1502, 1504, 1506, and 1508) of example model 1510. The occluded image 1522 can include a matched area (shown in FIG. 15 with backward hatched lines) and an unmatched area or occlusion (shown in FIG. 15 with forward hatched lines). In some examples, the example model 1510 can include a RAFT model, as previously described. At each stage 1502-1508, the model 1510 can generate an optical flow estimate and a matching map 1512 based on the image 1520 and the occluded image 1522. Moreover, in some examples, the model 1510 can calculate a match loss and in some cases an unmatch loss (also referred to as a self-supervised loss) at each stage 1502-1508.

In some cases, the model 1510 can calculate a total loss as follows: conventional/non-specific/non-discriminant loss+$\lambda$*matched loss. In some examples, $\lambda$ can be a scalar or hyperparameter implemented in the total loss equation to penalize and/or scale losses. In some examples, the conventional/non-specific/non-discriminant loss term can be optional. For example, in some cases, the model 1510 can calculate the total loss as $\lambda$*matched loss. As another example, the model 1510 can calculate the total loss as ($\alpha$*conventional/non-specific/non-discriminant loss)+$\lambda$*matched loss, where a can be a scalar term which could be set to 0 to turn off or negate the conventional/non-specific/non-discriminant loss term.

In some examples, the self-supervised learning process can implement occlusion masking and occlusion zeroing for image regions where no correspondence is present. Joint optimization can be performed with a match loss and in some cases an unmatch loss term with additional mask (e.g., error) for loss term.

In some cases, self-supervised learning, semi-supervised learning, and/or mixed supervision learning can implement generalizable transform functions and frame pairing. For example, with reference to FIG. 9A, frames 910 and 912 can form a labeled pair, frames 912 and 914 can form another labeled, pair, and frames 914 and 916 can form another labeled pair. Additional frame pairings can be generated for frames 910-916. For example, an additional frame pairing can be formed with frames 910 and 914, frames 910 and 916, frames 912 and 916, etc. With reference to FIG. 9B, zero-forcing 920 and random shifting 930 can be implemented for supervised learning.

Figure 16:
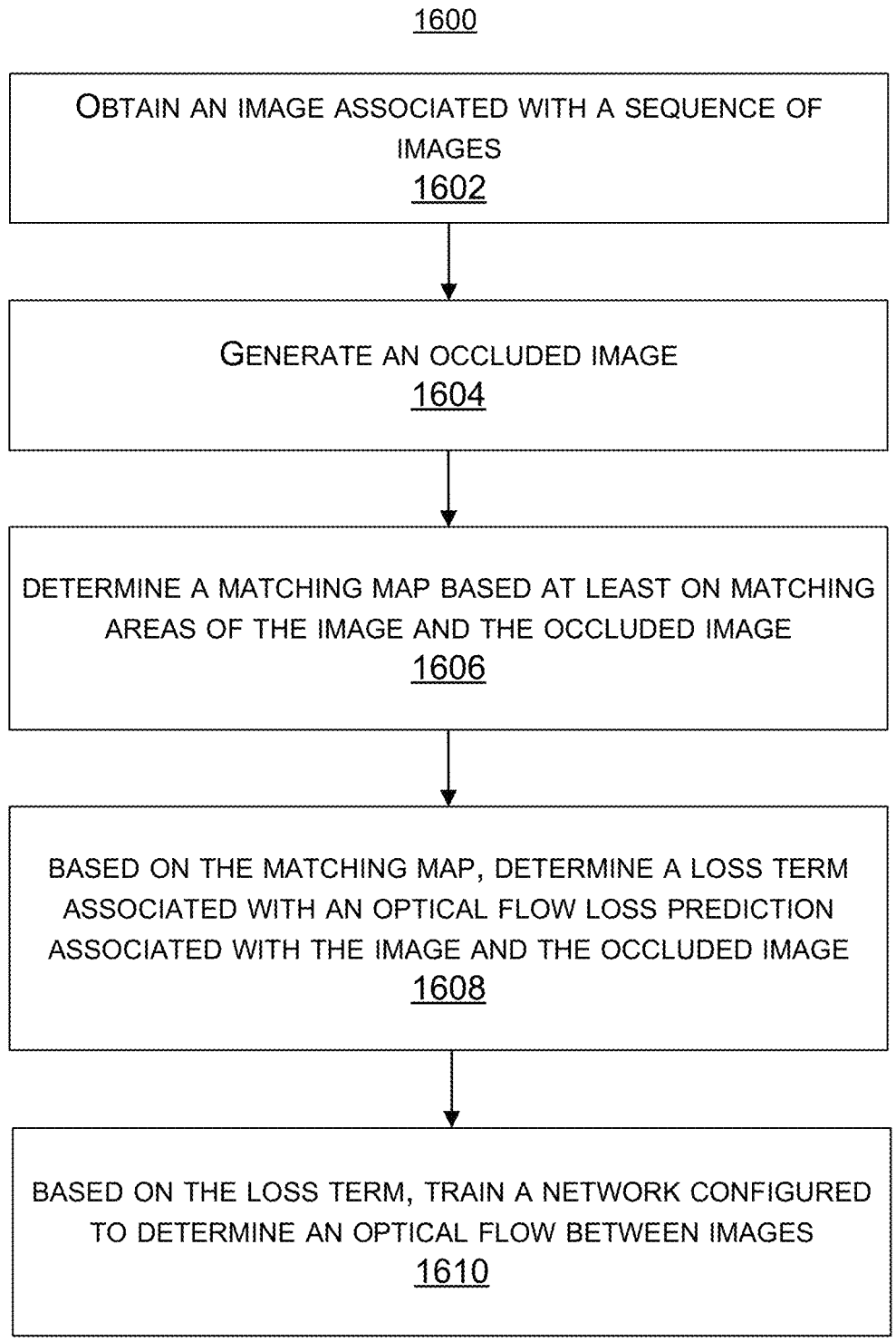
FIG. 16 is a flowchart illustrating an example process for supervised learning for optical flow estimation, in accordance with some examples of the present disclosure.

FIG. 16 is a flow diagram illustrating an example of a process 1600 for performing supervised learning for optical flow using the techniques described herein. In some examples, the supervised learning can include semi-supervised learning, self-supervised learning, and/or mixed-supervision learning. The operations outlined herein are non-limiting examples provided for illustration purposes, and can be implemented in any combination thereof, including combinations that exclude, add, or modify certain steps.

At block 1602, the process 1600 can include obtaining an image associated with a sequence of images. In some examples, the sequence of images can include labeled pairs of images. In some cases, each labeled pair of images can include a set of consecutive images within the sequence of images.

At block 1604, the process 1600 can include generating an occluded image. In some aspects, the occluded image includes the image with an occlusion applied to the image and/or a different image of the sequence of images with the occlusion applied to the different image. In some cases, the process 1600 can include generating the occlusion. The process 1600 can include applying the occlusion to at least one of the image and the different image. In some examples, the occlusion can include a cow-mask occlusion.

At block 1606, the process 1600 can include determining a matching map based on matching (and in some cases unmatching areas) of the image and the occluded image. As described herein, in some cases, the matching map predicts which pixels match between the image and the occluded image and which pixels do not image between the image and the occluded image. At block 1608, the process 1600 can include determining, based on the matching map, a loss term associated with an optical flow loss prediction associated with the image and the occluded image. The loss term includes at least a match loss term. In some cases, the loss term also includes an unmatch loss term. In one example as described above, an overall loss can be determined as follows: Ltotal=$L_S$+$\alpha_2 \cdot L_U$. The overall loss can also be represented as Total Loss=RAFT Loss+$\lambda$*Consistency Loss (where the consistency loss can be an unsupervised loss), as shown in FIG. 13A and FIG. 13B.

At block 1610, the process 1600 can include training, based on loss term, a network configured to determine an optical flow between images. For instance, the process 1600 can train the network (based on the loss term) using the semi-supervised learning, self-supervised learning, and/or mixed-supervision learning techniques described herein. The network can include any type of neural network. In some examples, the network can include a CNN. In some examples, the network can include a RAFT network. In some examples, training the network can be further based on one or more occlusion masks calculated for portions of the image and the occluded image having no correspondence. In some cases, training the network can be further based on labeled pairs of images from the sequence of images.

In some aspects, the process 1600 can include generating additional labeled pairs of images. For example, each additional labeled pair of images can include a set of non-consecutive images (images that are not consecutive or adjacent) within the sequence of images. In some cases, training the network is further based on the additional labeled pairs of images.

In some cases, the process 1600 can include applying one or more horizontal flips to the image and/or the different image to yield one or more flipped images. The process 1600 can include calculating one or more optical flow prediction losses based on the one or more flipped images. In some cases, the process 1600 can include applying one or more rotations to the image and/or the different image to yield one or more rotated images. The process 1600 can include calculating one or more optical flow prediction losses based on the one or more rotated images. In some examples, training the network is further based on the one or more optical flow prediction losses.

In some examples, the process 1600 may be performed by one or more computing devices or apparatuses. In one illustrative example, the process 1600 can be performed by the image processing system 100 shown in FIG. 1 and/or one or more computing devices with the computing device architecture 1700 shown in FIG. 1700. In some cases, such a computing device or apparatus may include a processor, microprocessor, microcomputer, or other component of a device that is configured to carry out the steps of the process 1600. In some examples, such computing device or apparatus may include one or more sensors configured to capture image data. For example, the computing device can include a smartphone, a camera, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1600 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 17:
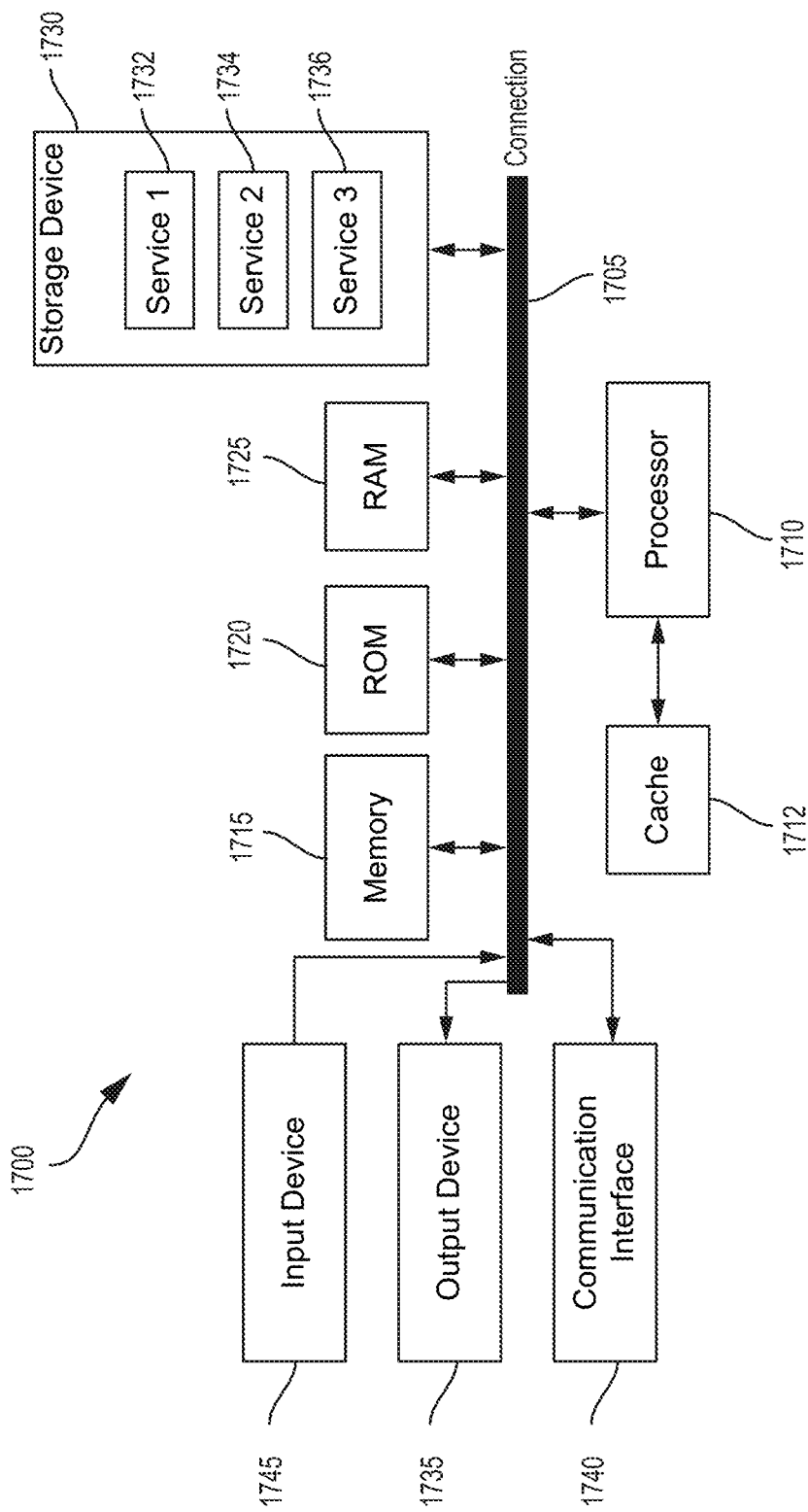
FIG. 17 illustrates an example computing device architecture, in accordance with some examples of the present disclosure.

FIG. 17 illustrates an example computing device architecture 1700 of an example computing device which can implement various techniques described herein. For example, the computing device architecture 1700 can implement at least some portions of the image processing system 100 shown in FIG. 1. The components of the computing device architecture 1700 are shown in electrical communication with each other using a connection 1705, such as a bus. The example computing device architecture 1700 includes a processing unit (CPU or processor) 1710 and a computing device connection 1705 that couples various computing device components including the computing device memory 1715, such as read only memory (ROM) 1720 and random access memory (RAM) 1725, to the processor 1710.

The computing device architecture 1700 can include a cache 1712 of high-speed memory connected directly with, in close proximity to, or integrated as part of the processor 1710. The computing device architecture 1700 can copy data from the memory 1715 and/or the storage device 1730 to the cache 1712 for quick access by the processor 1710. In this way, the cache can provide a performance boost that avoids processor 1710 delays while waiting for data. These and other modules can control or be configured to control the processor 1710 to perform various actions. Other computing device memory 1715 may be available for use as well. The memory 1715 can include multiple different types of memory with different performance characteristics. In some cases, the processor 1710 can include any general purpose processor and a hardware or software service (e.g., services 1732, 1734, and 1736) stored in storage device 1730 and configured to control the processor 1710. In some cases, the processor 1710 can include a special-purpose processor where software instructions are incorporated into the processor design. The processor 1710 may be a self-contained system, containing multiple cores or processors, a bus, memory controller, cache, etc. A multi-core processor may be symmetric or asymmetric.

To enable user interaction with the computing device architecture 1700, an input device 1745 can represent any number of input mechanisms, such as a microphone for speech, a touch-sensitive screen for gesture or graphical input, keyboard, mouse, motion input, speech and so forth. An output device 1735 can also be one or more of a number of output mechanisms known to those of skill in the art, such as a display, projector, television, speaker device. In some instances, multimodal computing devices can enable a user to provide multiple types of input to communicate with the computing device architecture 1700. The communication interface 1740 can generally govern and manage the user input and computing device output. There is no restriction on operating on any particular hardware arrangement and therefore the basic features here may easily be substituted for improved hardware or firmware arrangements as they are developed.

Storage device 1730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1175, read only memory (ROM) 1720, and hybrids thereof. The storage device 1730 can include software, code, firmware, etc., for controlling the processor 1710. Other hardware or software modules are contemplated. The storage device 1730 can be connected to the computing device connection 1705. In one aspect, a hardware module that performs a particular function can include the software component stored in a computer-readable medium in connection with the necessary hardware components, such as the processor 1710, connection 1705, output device 1735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method of performing supervised learning for optical flow estimation, the method comprising: obtaining an image associated with a sequence of images; generating an occluded image; determining a matching map based at least on matching areas of the image and the occluded image; based on the matching map, determining a loss term associated with an optical flow loss prediction associated with the image and the occluded image, the loss term comprising a match loss term; and based on the loss term, training a network configured to determine an optical flow between images.

Aspect 2: The method of Aspect 1, wherein training the network is further based on one or more occlusion masks calculated for portions of the image and the occluded image having no correspondence.

Aspect 3: The method of any of Aspect 1 or Aspect 2, wherein the sequence of images comprises labeled pairs of images, each labeled pair comprising a set of consecutive images within the sequence of images, wherein training the network is further based on the labeled pairs of images.

Aspect 4: The method of Aspect 3, further comprising: generating additional labeled pairs of images, each additional labeled pair comprising a set of non-consecutive images within the sequence of images, wherein training the network is further based on the additional labeled pairs of images.

Aspect 5: The method of any of Aspects 1 to 4, further comprising: applying one or more horizontal flips to the image to yield one or more flipped images; and calculating one or more optical flow prediction losses based on the one or more flipped images.

Aspect 6: The method of Aspect 5, wherein training the network is further based on the one or more optical flow prediction losses.

Aspect 7: The method of any of Aspects 1 to 6, further comprising: applying one or more rotations to the image to yield one or more rotated images; and calculating one or more optical flow prediction losses based on the one or more rotated images.

Aspect 8: The method of any of Aspects 1 to 7, wherein the network comprises a convolutional neural network.

Aspect 9: The method of any of Aspects 1 to 8, wherein the supervised learning comprises at least one of semi-supervised learning, self-supervised learning, and mixed-supervision learning.

Aspect 10: The method of any of Aspects 1 to 9, wherein the matching map predicts which pixels match between the image and the occluded image and which pixels do not image between the image and the occluded image.

Aspect 11: The method of any of Aspects 1 to 10, wherein the occluded image comprises at least one of the image with an occlusion applied to the image and a different image of the sequence of images with the occlusion applied to the different image.

Aspect 12: The method of Aspect 11, further comprising: generating the occlusion; and applying the occlusion to at least one of the image and the different image.

Aspect 13: The method Aspect 11, wherein the occlusion comprises a cow-mask occlusion.

Aspect 14: An apparatus for performing supervised learning for optical flow estimation. The apparatus includes a memory (e.g., implemented in circuitry) and one or more processors (one processor or multiple processors) communicatively coupled to the memory. The one or more processors are configured to: obtain an image associated with a sequence of images; generate an occluded image; determine a matching map based at least on matching areas of the image and the occluded image; based on the matching map, determine a loss term associated with an optical flow loss prediction associated with the image and the occluded image, the loss term comprising a match loss term; based on the loss term, train a network configured to determine an optical flow between images.

Aspect 15: The apparatus of Aspect 14, wherein training the network is further based on one or more occlusion masks calculated for portions of the image and the occluded image having no correspondence.

Aspect 16: The apparatus of any of Aspect 14 or Aspect 15, wherein the sequence of images comprises labeled pairs of images, each labeled pair comprising a set of consecutive images within the sequence of images and the sequence of images comprises labeled pairs of images, each labeled pair comprising a set of consecutive images within the sequence of images.

Aspect 17: The apparatus of Aspect 16, wherein the one or more processors are configured to: generate additional labeled pairs of images, each additional labeled pair comprising a set of non-consecutive images within the sequence of images, wherein training the network is further based on the additional labeled pairs of images.

Aspect 18: The apparatus of any of Aspects 14 to 17, wherein the one or more processors are configured to: apply one or more horizontal flips to the image to yield one or more flipped images; calculate one or more optical flow prediction losses based on the one or more flipped images.

Aspect 19: The apparatus of Aspect 18, wherein training the network is further based on the one or more optical flow prediction losses.

Aspect 20: The apparatus of any of Aspects 14 to 19, wherein the one or more processors are configured to: apply one or more rotations to the image to yield one or more rotated images; calculate one or more optical flow prediction losses based on the one or more rotated images.

Aspect 21: The apparatus of any of Aspects 14 to 20, wherein the network comprises a convolutional neural network.

Aspect 22: The apparatus of any of Aspects 14 to 21, wherein training the network is further based on supervised learning, and wherein the supervised learning comprises at least one of semi-supervised learning, self-supervised learning, and mixed-supervision learning.

Aspect 23: The apparatus of any of Aspects 14 to 22, wherein the matching map predicts which pixels match between the image and the occluded image and which pixels do not image between the image and the occluded image.

Aspect 24: The apparatus of any of Aspects 14 to 23, wherein the occluded image comprises at least one of the image with an occlusion applied to the image and a different image of the sequence of images with the occlusion applied to the different image.

Aspect 25: The apparatus of Aspect 24, wherein the one or more processors are configured to: apply the occlusion to at least one of the image and the different image.

Aspect 26: The apparatus of Aspect 24, wherein the occlusion comprises a cow-mask occlusion.

Aspect 27: The apparatus of any one of Aspects 14 to 26, wherein the one or more processors include a neural processing unit (NPU).

Aspect 28: The apparatus of any one of Aspects 14 to 27, wherein the apparatus is a mobile device.

Aspect 29: The apparatus of any one of Aspects 14 to 28, further comprising a camera configured to capture one or more frames.

Aspect 30: The apparatus of any one of Aspects 14 to 29, further comprising a display configured to display one or more images.

Aspect 31: A computer-readable storage medium storing instructions that, when executed, cause one or more processors to perform any of the operations of Aspects 1 to 30.

Aspect 32: An apparatus comprising means for performing any of the operations of Aspects 1 to 30.

What is claimed is:

1. A method of performing supervised learning for optical flow estimation, the method comprising:
   obtaining an image associated with a sequence of images;
   generating an occluded image by applying occlusion to the obtained image;
   determining a matching map based at least on matching areas of the image and the occluded image;
   based on the matching map, determining a loss term associated with an optical flow loss prediction associated with the image and the occluded image, the loss term comprising a match loss term and an unmatch loss term; and
   based on the loss term, training a network configured to determine an optical flow between images.

2. The method of claim 1, wherein training the network is further based on one or more occlusion masks calculated for portions of the image and the occluded image having no correspondence.

3. The method of claim 1, wherein the sequence of images comprises labeled pairs of images, each labeled pair comprising a set of consecutive images within the sequence of images, wherein training the network is further based on the labeled pairs of images.

4. The method of claim 3, further comprising:
generating additional labeled pairs of images, each additional labeled pair comprising a set of non-consecutive images within the sequence of images, wherein training the network is further based on the additional labeled pairs of images.

5. The method of claim 1, further comprising:
applying one or more horizontal flips to the image to yield one or more flipped images; and
calculating one or more optical flow prediction losses based on the one or more flipped images.

6. The method of claim 5, wherein training the network is further based on the one or more optical flow prediction losses.

7. The method of claim 1, further comprising:
applying one or more rotations to the image to yield one or more rotated images; and
calculating one or more optical flow prediction losses based on the one or more rotated images.

8. The method of claim 1, wherein the network comprises a convolutional neural network.

9. The method of claim 1, wherein training the network is further based on supervised learning, and wherein the supervised learning comprises at least one of semi-supervised learning, self-supervised learning, and mixed-supervision learning.

10. The method of claim 1, wherein the matching map predicts which pixels match between the image and the occluded image and which pixels do not match between the image and the occluded image.

11. The method of claim 1, wherein the occluded image comprises at least one of the image with an occlusion applied to the image and a different image of the sequence of images with the occlusion applied to the different image.

12. The method of claim 11, further comprising:
generating the occlusion; and
applying the occlusion to at least one of the image and the different image.

13. The method of claim 11, wherein the occlusion comprises a cow-mask occlusion.

14. An apparatus for performing supervised learning for optical flow estimation, comprising:
a memory; and
one or more processors communicatively coupled to the memory, the one or more processors being configured to:
obtain an image associated with a sequence of images;
generate an occluded image by applying occlusion to the obtained image;
determine a matching map based at least on matching areas of the image and the occluded image;
based on the matching map, determine a loss term associated with an optical flow loss prediction associated with the image and the occluded image, the loss term comprising a match loss term and an unmatch loss term; and
based on the loss term, train a network configured to determine an optical flow between images.

15. The apparatus of claim 14, wherein the one or more processors are configured to train the network further based on one or more occlusion masks calculated for portions of the image and the occluded image having no correspondence.

16. The apparatus of claim 14, wherein the sequence of images comprises labeled pairs of images, each labeled pair comprising a set of consecutive images within the sequence of images, wherein training the network is further based on the labeled pairs of images.

17. The apparatus of claim 16, wherein the one or more processors are configured to:
generate additional labeled pairs of images, each additional labeled pair comprising a set of non-consecutive images within the sequence of images, wherein training the network is further based on the additional labeled pairs of images.

18. The apparatus of claim 14, wherein the one or more processors are configured to:
apply one or more horizontal flips to the image to yield one or more flipped images; and
calculate one or more optical flow prediction losses based on the one or more flipped images.

19. The apparatus of claim 18, wherein the one or more processors are configured to train the network further based on the one or more optical flow prediction losses.

20. The apparatus of claim 14, wherein the one or more processors are configured to:
apply one or more rotations to the image to yield one or more rotated images; and
calculate one or more optical flow prediction losses based on the one or more rotated images.

21. The apparatus of claim 14, wherein the network comprises a convolutional neural network.

22. The apparatus of claim 14, wherein the one or more processors are configured to train the network using supervised learning, the supervised learning comprising at least one of semi-supervised learning, self-supervised learning, and mixed-supervision learning.

23. The apparatus of claim 14, wherein the matching map predicts which pixels match between the image and the occluded image and which pixels do not match between the image and the occluded image.

24. The apparatus of claim 14, wherein the occluded image comprises at least one of the image with an occlusion applied to the image and a different image of the sequence of images with the occlusion applied to the different image.

25. The apparatus of claim 24, further comprising:
generating the occlusion; and
applying the occlusion to at least one of the image and the different image.

26. The apparatus of claim 24, wherein the occlusion comprises a cow-mask occlusion.

27. A non-transitory computer-readable storage medium having stored thereon instructions which, when executed by one or more processors, cause the one or more processors to:
obtain an image associated with a sequence of images;
generate an occluded image by applying occlusion to the obtained image;
determine a matching map based on matching areas of the image and the occluded image;
based on the matching map, determine a loss term associated with an optical flow loss prediction associated with the image and the occluded image, the loss term comprising a match loss term and an unmatch loss term; and
based on the loss term, train a network configured to determine an optical flow between images.

28. The non-transitory computer-readable storage medium of claim 27, wherein training the network is further based on one or more occlusion masks calculated for portions of the image and the occluded image having no correspondence.

29. The non-transitory computer-readable storage medium of claim 27, wherein the sequence of images comprises labeled pairs of images, each labeled pair comprising a set of consecutive images within the sequence of images, wherein training the network is further based on the labeled pairs of images.

30. The non-transitory computer-readable storage medium of claim 27, wherein the occluded image comprises at least one of the image with an occlusion applied to the image and a different image of the sequence of images with the occlusion applied to the different image.

31. A method of performing supervised learning for optical flow estimation, the method comprising:
   obtaining an image associated with a sequence of images;
   generating an occluded image by applying occlusion to the obtained image, the occluded image comprising a matched area and an unmatched area;
   determining a matching map based at least on matching areas of the obtained image and the generated occluded image;
   based on the matching map, determining a loss term associated with an optical flow loss prediction associated with the obtained image and the occluded image, the loss term comprising a match loss and an unmatch loss;
   performing optimization of the loss term using the match loss and the unmatch loss, the optimized loss term being used to train a network configured to determine an optical flow between images.

* * * * *